US011729523B2

(12) United States Patent
Lee et al.

(10) Patent No.: US 11,729,523 B2
(45) Date of Patent: Aug. 15, 2023

(54) METHOD OF TESTING IMAGE SENSOR USING FREQUENCY DOMAIN, TEST SYSTEM PERFORMING THE SAME AND METHOD OF MANUFACTURING IMAGE SENSOR USING THE SAME

(71) Applicant: Samsung Electronics Co., Ltd., Suwon-si (KR)

(72) Inventors: Jongbae Lee, Asan-si (KR); Kiryel Ko, Hwaseong-si (KR); Jinmyoung An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/460,592

(22) Filed: Aug. 30, 2021

(65) Prior Publication Data

US 2022/0114755 A1 Apr. 14, 2022

(30) Foreign Application Priority Data

Oct. 12, 2020 (KR) ........................ 10-2020-0130831

(51) Int. Cl.
*H04N 17/00* (2006.01)
*H04N 25/00* (2023.01)

(52) U.S. Cl.
CPC ........... *H04N 25/00* (2023.01); *H04N 17/002* (2013.01)

(58) Field of Classification Search
CPC ......... H04N 25/00; H04N 17/002; H04N 5/30
See application file for complete search history.

(56) References Cited

U.S. PATENT DOCUMENTS

| | | | | |
|---|---|---|---|---|
| 4,535,359 A * | 8/1985 | Fearnside | .............. | H04N 25/63 348/251 |
| 5,649,022 A | 7/1997 | Maeda et al. | | |
| 5,754,678 A * | 5/1998 | Hawthorne | ............ | G09G 3/006 348/E17.005 |
| 6,148,097 A * | 11/2000 | Nakayama | ......... | G01M 11/0264 382/141 |
| 6,188,785 B1 | 2/2001 | Nakamura et al. | | |
| 6,317,512 B1 | 11/2001 | Maeda et al. | | |
| 6,819,358 B1 * | 11/2004 | Kagle | .................... | H04N 25/68 348/E5.081 |
| 6,995,794 B2 * | 2/2006 | Hsu | ........................ | H04N 23/80 348/E5.079 |
| 7,009,644 B1 * | 3/2006 | Sanchez | ............ | H04N 21/4143 348/E5.079 |
| 7,085,408 B1 * | 8/2006 | Chung-Chi Jim | ..... | H04N 25/00 382/312 |

(Continued)

FOREIGN PATENT DOCUMENTS

| | | |
|---|---|---|
| JP | 2956651 B2 | 10/1999 |
| JP | 2971628 B2 | 11/1999 |

(Continued)

*Primary Examiner* — Brian P Yenke
(74) *Attorney, Agent, or Firm* — Muir Patent Law, PLLC

(57) ABSTRACT

In a method of testing an image sensor, at least one test image is captured using the image sensor that is a device under test (DUT). A composite image is generated based on the at least one test image. A plurality of frequency data are generated by performing frequency signal processing on the composite image. It is determined whether the image sensor is defective by analyzing the plurality of frequency data.

18 Claims, 29 Drawing Sheets

(56) References Cited

U.S. PATENT DOCUMENTS

| | | |
|---|---|---|
| 7,656,436 B2 | 2/2010 | Kinoshita et al. |
| 7,800,662 B2 * | 9/2010 | Sumiya ............... H04N 25/683 |
| | | 348/246 |
| 7,876,369 B2 * | 1/2011 | Aoki ..................... H04N 25/68 |
| | | 348/246 |
| 8,248,483 B2 * | 8/2012 | Ezawa ................. G06T 7/0004 |
| | | 348/222.1 |
| 8,705,046 B2 | 4/2014 | Yun et al. |
| 8,754,964 B2 * | 6/2014 | Yamaguchi ........... H04N 25/68 |
| | | 348/241 |
| 8,902,336 B2 * | 12/2014 | Kolli ..................... H04N 25/68 |
| | | 348/241 |
| 8,988,562 B2 * | 3/2015 | Irinouchi ............... H04N 25/68 |
| | | 348/246 |
| 9,055,228 B2 * | 6/2015 | Kinoshita ........... H04N 23/745 |
| 9,161,029 B1 * | 10/2015 | Kumar ..................... G06T 5/50 |
| 9,386,245 B2 * | 7/2016 | Fujita ................... H04N 25/583 |
| 9,495,591 B2 | 11/2016 | Visser et al. |
| 9,800,772 B2 * | 10/2017 | Miyatani ............. H04N 23/672 |
| 10,104,301 B2 * | 10/2018 | Nakagawara .......... H04N 23/80 |
| 10,348,989 B2 * | 7/2019 | Fujita ................... H04N 23/84 |
| 10,812,787 B2 * | 10/2020 | Lee ....................... H04N 25/76 |
| 10,904,436 B2 * | 1/2021 | Heo ..................... H04N 23/667 |
| 10,986,315 B2 * | 4/2021 | Choi ..................... H04N 23/84 |
| 11,107,206 B2 * | 8/2021 | Bhattacharya .......... G06T 5/005 |
| 2003/0090566 A1 * | 5/2003 | Smith ................... H04N 23/70 |
| | | 348/E5.034 |
| 2005/0219390 A1 * | 10/2005 | Tajima ................. H04N 25/70 |
| | | 348/E5.081 |
| 2006/0193506 A1 * | 8/2006 | Dorphan ............ G01N 21/9501 |
| | | 382/145 |
| 2006/0244843 A1 * | 11/2006 | Dierickx ............... H04N 23/70 |
| | | 348/226.1 |
| 2007/0133893 A1 | 6/2007 | Jerdev |
| 2008/0158363 A1 * | 7/2008 | Myers ................... H04N 25/00 |
| | | 348/246 |
| 2010/0013964 A1 * | 1/2010 | Negishi ................. H04N 25/68 |
| | | 348/E9.037 |
| 2012/0281123 A1 * | 11/2012 | Hoda ................... H04N 25/683 |
| | | 348/E5.079 |
| 2017/0302867 A1 * | 10/2017 | Ichikawa ............... H04N 1/409 |

FOREIGN PATENT DOCUMENTS

| | | |
|---|---|---|
| KR | 1020050075425 A | 7/2005 |
| KR | 20080078044 A | 8/2008 |
| KR | 20190119372 A | 10/2019 |

* cited by examiner

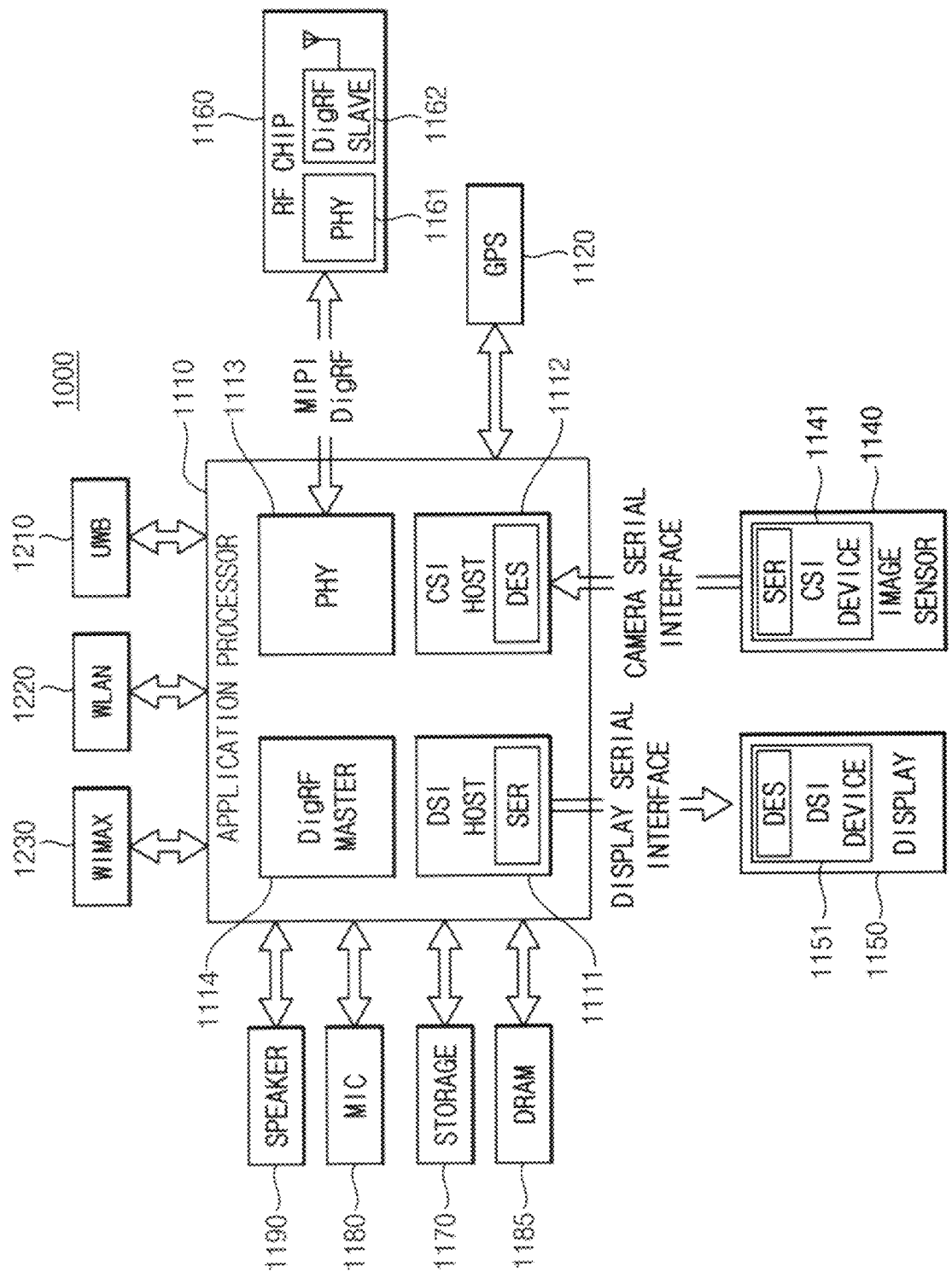

METHOD OF TESTING IMAGE SENSOR USING FREQUENCY DOMAIN, TEST SYSTEM PERFORMING THE SAME AND METHOD OF MANUFACTURING IMAGE SENSOR USING THE SAME

CROSS-REFERENCE TO RELATED APPLICATION

This application claims priority under 35 USC § 119 to Korean Patent Application No. 10-2020-0130831 filed on Oct. 12, 2020 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of testing image sensors using frequency domains, test systems performing the methods, and methods of manufacturing image sensors using the methods.

2. Description of the Related Art

A complementary metal oxide semiconductor (CMOS) image sensor is an image capturing device manufactured using CMOS processes. The CMOS image sensor typically has lower manufacturing costs and a smaller pixel size than conventional charge coupled device (CCD) image sensors that typically utilize relatively high-voltage analog circuits. Accordingly, CMOS-type image sensors may have lower power consumption requirements relative to CCD-type image sensors. Moreover, with the continued improvement in performance of CMOS image sensors, CMOS image sensors are becoming more widely used in mobile electronic devices such as smart phones, tablet personal computers (PCs), and digital cameras.

The standard mobile imaging architecture (SMIA) standard has been used to maintain the characteristics of the CMOS image sensors and determine whether the CMOS image sensors are defective or not. Recently, as the characteristic of the CMOS image sensor improves and the complexity of the CMOS image sensor increases, various unusual noises that are not detected by the SMIA standard have occurred. Thus, various schemes of detecting the defects on the CMOS image sensor have been researched.

SUMMARY

At least one example embodiment of the present disclosure provides a method of testing an image sensor capable of efficiently detecting defects on the image sensor using a frequency domain.

At least one example embodiment of the present disclosure provides a test system that performs the method of testing the image sensor.

At least one example embodiment of the present disclosure provides a method of manufacturing an image sensor that is performed using the method of testing the image sensor.

According to example embodiments, in a method of testing an image sensor, at least one test image is captured using the image sensor that is a device under test (DUT). A composite image is generated based on the at least one test image. A plurality of frequency data are generated by performing a frequency signal processing on the composite image. It is determined whether the image sensor is defective by analyzing the plurality of frequency data.

According to example embodiments, a test system includes a test board and a test image processor. The test board is a board on which an image sensor that is a device under test (DUT) is mounted. The test image processor receives at least one test image that is captured by the image sensor, generates a composite image based on the at least one test image, generates a plurality of frequency data by performing a frequency signal processing on the composite image, and determines whether the image sensor is defective by analyzing the plurality of frequency data.

According to example embodiments, in a method of testing an image sensor, a plurality of test images are generated, by the image sensor that is a device under test (DUT), by capturing light generated from a polarization light source or by capturing an environment without a light source. A composite image is generated by averaging pixel values in the plurality of test images, or by subtracting pixel values in one test image from pixel values in another test image. A conversion image corresponding to a frequency domain is generated by performing a frequency signal processing on composite pixel values having a same color among a plurality of composite pixel values included in the composite image. First frequency data for first conversion values among a plurality of conversion values included in the conversion image is generated. The first conversion values are arranged on a first line extending along a first direction in the conversion image. Second frequency data for second conversion values among the plurality of conversion values is generated. The second conversion values are arranged on a second line extending along a second direction crossing the first direction in the conversion image. It is determined, by analyzing each of the first and second frequency data, whether at least one of the first and second frequency data includes a first conversion value greater than a first threshold value. It is determined, by analyzing each of the first and second frequency data, whether at least one of the first and second frequency data includes a second conversion value greater than an adjacent conversion value, a difference between the second conversion value and the adjacent conversion value is greater than or equal to a reference range. It is determined that the image sensor has a defect when at least one of the first conversion value is greater than the first threshold value and the second conversion value is greater than the adjacent conversion value with the difference between the second conversion value and the adjacent conversion value being greater than or equal to the reference range.

According to example embodiments, in a method of manufacturing an image sensor, the image sensor is fabricated. The image sensor is tested. When testing the image sensor, at least one test image is captured using the image sensor that is a device under test (DUT). A composite image is generated based on the at least one test image. A plurality of frequency data are generated by performing a frequency signal processing on the composite image. It is determined whether the image sensor is defective by analyzing the plurality of frequency data.

In the method of testing the image sensor, according to example embodiments, a frequency domain may be used to detect the defects on the image sensor. For example, multiple images for testing may be obtained by the image sensor in a relatively dark environment. A composite image may be generated by synthesizing the multiple images. The composite image may be transformed into a conversion image with the frequency domain by performing frequency signal processing in the frequency domain. It may be determined, by analyzing the conversion image with the frequency domain, whether the noise exists on the image sensor. In the method according to example embodiments, a band pattern noise, that is undetectable by a conventional test method, may be detected, separated, and analyzed. Accordingly, the defects on the image sensor may be accurately and efficiently detected.

BRIEF DESCRIPTION OF THE DRAWINGS

Illustrative, non-limiting example embodiments will be more clearly understood from the following detailed description taken in conjunction with the accompanying drawings.

FIG. 28 is a block diagram illustrating an electronic system including an image sensor according to example embodiments.

DETAILED DESCRIPTION OF THE EMBODIMENTS

Figure 1:
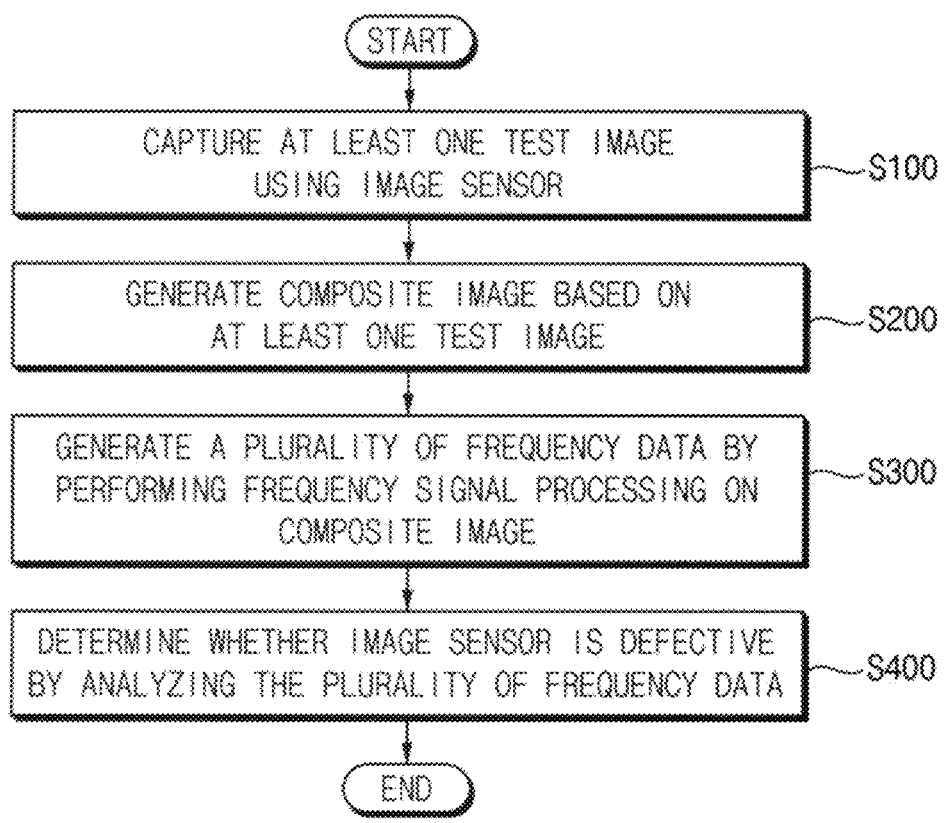
FIG. 1 is a flowchart illustrating a method of testing an image sensor according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a flowchart illustrating a method of testing an image sensor according to example embodiments.

Referring to FIG. 1, a method of testing an image sensor according to example embodiments is performed by a test system that includes a test board and a test image processor. The image sensor is mounted on the test board. The test image processor analyzes and/or processes an image obtained by the image sensor, and determines whether the image sensor is defective. Detailed configurations of the image sensor will be described with reference to FIGS. 2, 3 and 21. Detailed configurations of the test system will be described with reference to FIGS. 24, 25 and 26.

In the method of testing the image sensor according to example embodiments, at least one test image is captured using the image sensor that is a device under test (DUT) (step S100). For example, the at least one test image may be obtained or acquired in a relatively dark environment. Step S100 will be described in detail with reference to FIGS. 4 and 5.

A composite image (or synthesis image) is generated based on the at least one test image (step S200). For example, the composite image may be obtained by performing an averaging operation or a subtracting (or difference) operation based on the test image. For another example, the test image itself may be output as the composite image. Step S200 will be described in detail with reference to FIGS. 6, 7, 8, 9, 10, 11, 12A and 12B.

A plurality of frequency data are generated by performing a frequency signal processing on the composite image (step S300). For example, when the frequency signal processing is performed on the composite image, the composite image may be transformed or converted into an image with a frequency domain. Step S300 will be described in detail with reference to FIGS. 13, 14A, 14B, 14C, 14D, 15 and 16.

It is determined whether the image sensor is defective by analyzing the plurality of frequency data (step S400). For example, when at least one of the plurality of frequency data satisfies or complies with a predetermined condition, it may be determined that the image sensor has a defect (or the image sensor may be determined as a defective image sensor). Step S400 will be described in detail with reference to FIGS. 17, 18, 19 and 20.

In the method of testing the image sensor according to example embodiments, the frequency domain may be used to detect the defects on the image sensor. For example, multiple images for testing may be obtained by the image sensor in a relatively dark environment, the composite image generated by synthesizing the multiple images may be transformed into the image with the frequency domain, and it may be determined, by analyzing the image with the frequency domain, whether the noise exists on the image sensor. In the method according to example embodiments, the band pattern noise, that is undetectable by a conventional test method may be detected, separated, and analyzed. Accordingly, the defects on the image sensor may be accurately and efficiently detected.

Figure 2:
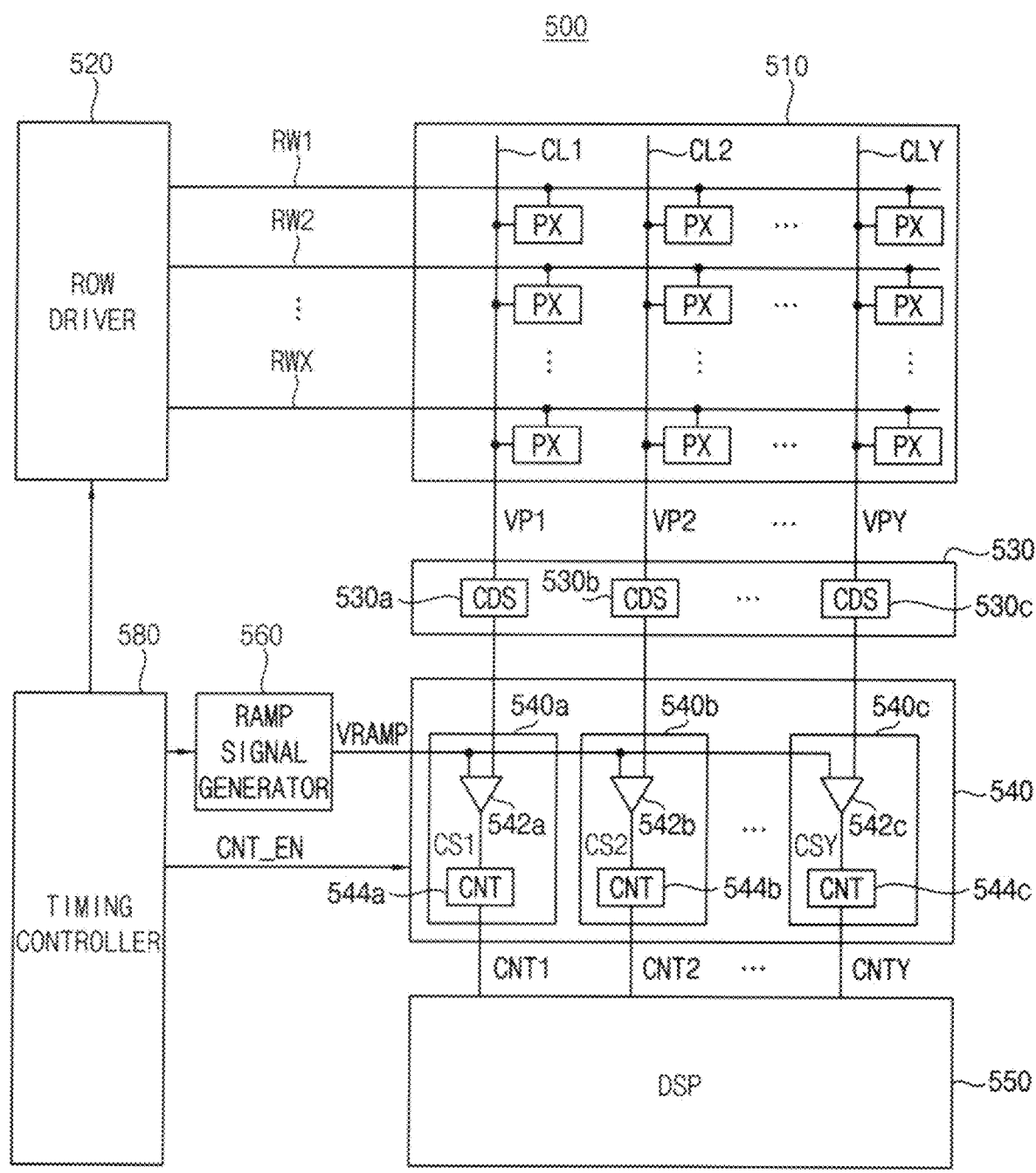
FIG. 2 is a block diagram illustrating an example of an image sensor tested according to example embodiments.

FIG. 2 is a block diagram illustrating an example of an image sensor tested according to example embodiments.

Referring to FIG. 2, an image sensor 500 includes a pixel array 510, a correlated double sampling (CDS) block 530 and an analog-to-digital converting (ADC) block 540. The image sensor 500 may further include a row driver 520, a digital signal processor 550, a ramp signal generator 560 and a timing controller 580.

The pixel array 510 may include a plurality of pixels (or unit pixels) PX that are arranged in a matrix formation. Each of the plurality of pixels PX may be connected to a respective one of a plurality of rows RW1, RW2, ..., RWX and a respective one of a plurality of columns CL1, CL2, ..., CLY, where each of X and Y is a natural number greater than or equal to two. The pixel array 510 generates a plurality of analog pixel signals VP1, VP2, ..., VPY based on incident light.

In some example embodiments, the plurality of pixels PX may include only first pixels that detect an image, and the image sensor 500 may be a normal image sensor. In other example embodiments, the plurality of pixels PX may include first pixels that detect an image and second pixels that detect a phase difference, and the image sensor 500 may be an auto-focus image sensor. Configurations of each of the plurality of pixels PX and the pixel array 510 will be described in detail with reference to FIGS. 3A, 3B, 3C, 21A and 21B.

The row driver 520 may be connected to the plurality of rows RW1 through RWX of the pixel array 510. The row driver 520 may generate driving signals to drive the plurality of rows RW1 through RWX. For example, the row driver 520 may drive the plurality of pixels PX included in the pixel array 510 row by row.

The correlated double sampling block 530 may include a plurality of correlated double sampling circuits (CDSs) 530a, 530b, ..., 530c. The plurality of correlated double sampling circuits 530a through 530c may be connected to the plurality of columns CL1 through CLY of the pixel array 510. The plurality of correlated double sampling circuits 530a through 530c may perform a correlated double sampling operation on the plurality of analog pixel signals VP1 through VPY output from the pixel array 510.

The analog-to-digital converting block 540 may include a plurality of analog-to-digital converters 540a, 540b, ..., 540c. The plurality of analog-to-digital converters 540a through 540c may be connected to the plurality of columns CL1 through CLY of the pixel array 510 via the plurality of correlated double sampling circuits 530a through 530c. The plurality of analog-to-digital converters 540a through 540c may perform a column analog-to-digital converting operation that converts the plurality of analog pixel signals VP1 through VPY (e.g., a plurality of correlated double sampled analog pixel signals output from the plurality of correlated double sampling circuits 530a through 530c) into a plurality of digital signals CNT1, CNT2, ..., CNTY in parallel (e.g., simultaneously or concurrently).

Each of the plurality of analog-to-digital converters 540a through 540c may include a respective one of a plurality of comparators 542a, 542b, ..., 542c and a respective one of a plurality of counters (CNTs) 544a, 544b, ..., 544c. For example, the first analog-to-digital converter 540a may include the first comparator 542a and the first counter 544a.

The first comparator 542a may compare the first analog pixel signal VP1 (e.g., the correlated double sampled first analog pixel signal output from the first correlated double sampling circuit 530a) with a ramp signal VRAMP to generate a first comparison signal CS1. The first counter 544a may count a level transition timing of the first comparison signal CS1 to generate the first digital signal CNT1.

Operations of the correlated double sampling block 530 and the analog-to-digital converting block 540 may be performed on the plurality of pixels PX included in the pixel array 510 row by row.

The plurality of correlated double sampling circuits 530a through 530c and the plurality of analog-to-digital converters 540a through 540c may form a plurality of column driving circuits. For example, the first correlated double sampling circuit 530a and the first analog-to-digital converter 540a may form a first column driving circuit.

The digital signal processor 550 may perform a digital signal processing operation based on the plurality of digital signals CNT1 through CNTY. For example, an operation of obtaining an image frame using the first pixels and/or an operation of obtaining auto-focus information using the second pixels may be performed by the digital signal processor 550. The digital signal processor 550 may output at least one image frame data generated by the digital signal processing operation.

The ramp signal generator 560 may generate the ramp signal VRAMP. The timing controller 580 may control overall operation timings of the image sensor 500, and may generate control signals including a count enable signal CNT_EN, a clock signal (not illustrated), etc.

Figure 3A:
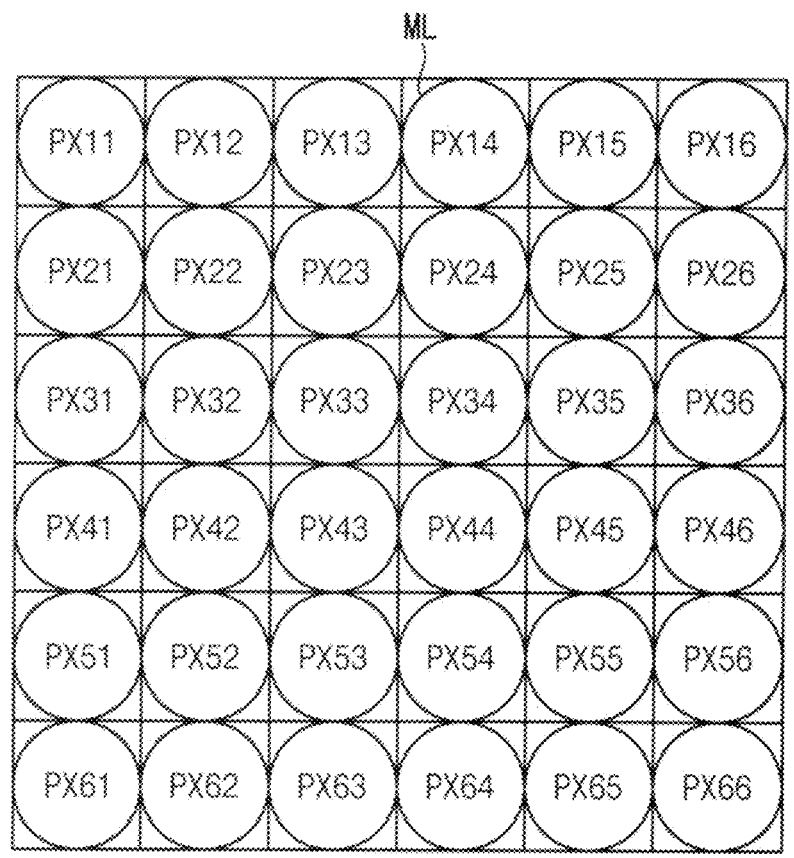
FIGS. 3A, 3B and 3C are diagrams illustrating an example of a pixel array and a pixel included in an image sensor of FIG. 2.
Figure 3A:
Figure 3B:
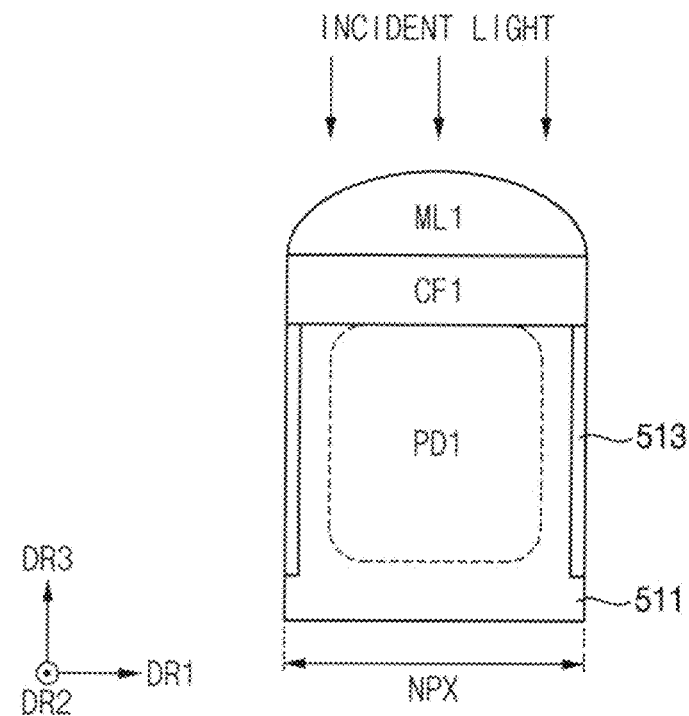
Figure 3C:
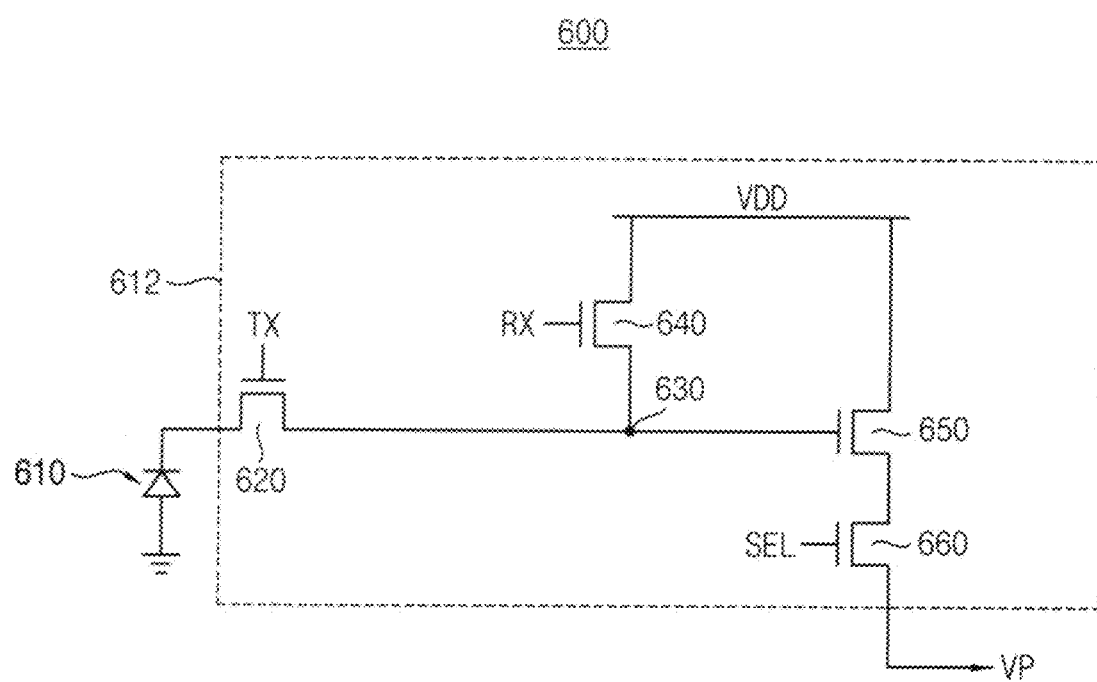

FIGS. 3A, 3B and 3C are diagrams illustrating an example of a pixel array and a pixel included in an image sensor of FIG. 2.

FIG. 3A is a plan view of an example of a pixel array included in the image sensor 500 of FIG. 2 when the image sensor 500 is a normal image sensor. FIG. 3B is a cross-sectional view of an example of a pixel included in the pixel array of FIG. 3A. FIG. 3C is a circuit diagram illustrating an example of a pixel included in the pixel array 510 included in the image sensor 500 of FIG. 2.

Referring to FIG. 3A, a pixel array 512 included in a normal image sensor may include a plurality of pixels PX11, PX12, PX13, PX14, PX15, PX16, PX21, PX22, PX23, PX24, PX25, PX26, PX31, PX32, PX33, PX34, PX35, PX36, PX41, PX42, PX43, PX44, PX45, PX46, PX51, PX52, PX53, PX54, PX55, PX56, PX61, PX62, PX63, PX64, PX65 and PX66.

All of the plurality of pixels PX11 through PX16, PX21 through PX26, PX31 through PX36, PX41 through PX46, PX51 through PX56, and PX61 through PX66 may be first pixels that detect an image. The first pixels may be referred to as normal pixels. Micro lenses ML may be disposed on the plurality of pixels PX11 through PX16, PX21 through PX26, PX31 through PX36, PX41 through PX46, PX51 through PX56, and PX61 through PX66.

Although FIG. 3A illustrates an example where six pixels are disposed in the pixel array 512 in a first direction DR1, six pixels are disposed in the pixel array 512 in a second direction DR2 crossing (e.g., substantially perpendicular to) the first direction DR1, and the pixel array 512 includes thirty six normal pixels, example embodiments are not limited thereto. The size of the pixel array and the number of the pixels may be changed according to example embodiments.

Referring to FIG. 3B, a first pixel (or normal pixel) NPX may include a first photoelectric conversion region PD1, a first color filter CF1 and a first micro lens ML1. For example, the first pixel NPX may correspond to the pixel PX11 in FIG. 3A.

The first photoelectric conversion region PD1 may be formed in a substrate 511. The first color filter CF1 may be formed on the first photoelectric conversion region PD1 (e.g., along a third direction DR3 crossing (e.g., substantially perpendicular to) the first and second directions DR1 and DR2). The first micro lens ML1 may be formed on the first color filter CF1.

The first photoelectric conversion region PD1 may correspond to a photoelectric conversion unit 610 in FIG. 3C, and may perform a photoelectric conversion operation based on incident light to generate photo-charges. For example, the first photoelectric conversion region PD1 may generate electron-hole pairs in response to the incident light, and may collect the electrons and/or the holes of the electron-hole pairs. The first photoelectric conversion region PD1 may include a photo diode, a photo transistor, a photo gate, a pinned photo diode (PPD) and/or a combination thereof.

In some example embodiments, the first color filter CF1 may include a red filter, a green filter and/or a blue filter. In other example embodiments, the first color filter CF1 may include a yellow filter, a magenta filter and/or a cyan filter. The first color filter CF1 may further include a white filter (or transparent filter).

The first micro lens ML1 may adjust a path of light entering the first micro lens ML1 such that the light is focused on the first photoelectric conversion region PD1.

In some example embodiments, micro lenses including the first micro lens ML1 may form a micro lens array, and color filters including the first color filter CF1 may form a color filter array.

In some example embodiments, the pixel array may further include a device isolation region 513 formed surrounding the first photoelectric conversion region PD1. The device isolation region 513 may be formed or disposed in the substrate 511, and may extend substantially vertically from a surface of the substrate 511 in the third direction DR3 so as to penetrate the substrate 511 to isolate or separate the photoelectric conversion region of each pixel in the pixel array 512 from each other. The device isolation region 513 may have a mesh structure in a plan view.

In some example embodiments, the image sensor may be a frontside illuminated image sensor (FIS) that operates in response to the incident light passing through a front surface of the substrate 511 or a backside illuminated image sensor (BIS) that operates in response to incident light passing through the back surface of the substrate 511. Although not illustrated in detail, gate electrodes and wirings for forming a signal generation unit 612 in FIG. 3C may be disposed on the front or back surface of the substrate 511.

Referring to FIG. 3C, a pixel (or unit pixel) 600 may include a photoelectric conversion unit 610 and a signal generation unit 612.

The photoelectric conversion unit 610 may perform a photoelectric conversion operation. For example, the photoelectric conversion unit 610 may convert the incident light into photo-charges during an integration mode. If an image sensor including the pixel 600 is a complementary metal oxide semiconductor (CMOS) image sensor, image information on an object to be captured may be obtained by collecting charge carriers (e.g., electron-hole pairs) in the photoelectric conversion unit 610 proportional to intensity of the incident light through an open shutter of the CMOS image sensor during the integration mode.

The signal generation unit 612 may generate an electric signal (e.g., an analog pixel signal VP) based on the photo-charges generated by the photoelectric conversion operation during a readout mode. If the image sensor including the pixel 600 is the CMOS image sensor, the shutter may be closed, and the analog pixel signal VP may be generated based on the image information in a form of the charge carriers during the readout mode after the integration mode. For example, as illustrated in FIG. 3C, the pixel 600 may have a four-transistor structure including four transistors.

For example, the signal generation unit 612 may include a transfer transistor 620, a reset transistor 640, a driving transistor 650, a selection transistor 660 and a floating diffusion node 630. The transfer transistor 620 may be connected between the photoelectric conversion unit 610 and the floating diffusion node 630, and may include a gate electrode receiving a transfer signal TX. The reset transistor 640 may be connected between a power supply voltage VDD and the floating diffusion node 630, and may include a gate electrode receiving a reset signal RX. The driving transistor 650 may be connected between the power supply voltage VDD and the selection transistor 660, and may include a gate electrode connected to the floating diffusion node 630. The selection transistor 660 may be connected between the driving transistor 650 and an output terminal outputting the analog pixel signal VP, and may include a gate electrode receiving a selection signal SEL.

In some example embodiments, one signal generation unit 612 may be shared by a plurality of photoelectric conversion units 610.

Figure 4:
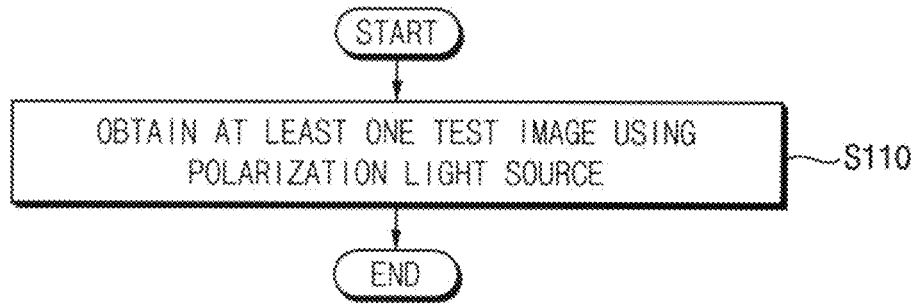
FIGS. 4 and 5 are flowcharts illustrating examples of capturing at least one test image in FIG. 1.
Figure 5:
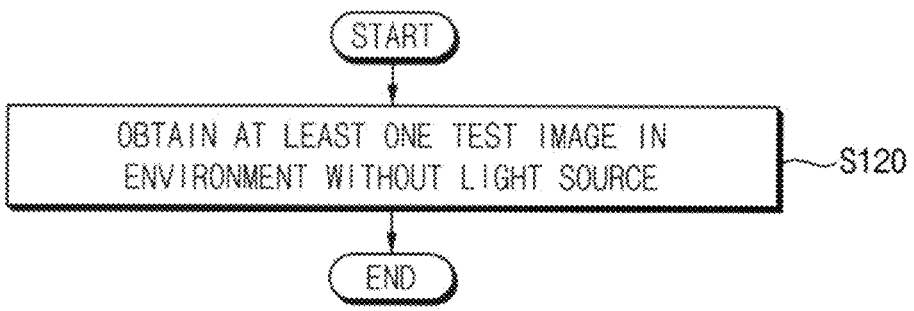

FIGS. 4 and 5 are flowcharts illustrating examples of capturing at least one test image in FIG. 1.

Referring to FIGS. 1 and 4, when capturing the at least one test image (step S100), the at least one test image may be obtained using a polarization light source (step S110). For example, the polarization light source may generate light having a constant polarization direction, and the image sensor may obtain the at least one test image by capturing the light generated from the polarization light source. In some example embodiments, the image sensor may be surrounded by a light shielding member (or light blocking member) to block light other than the light generated from the polarization light source.

Referring to FIGS. 1 and 5, when capturing the at least one test image (step S100), the at least one test image may be obtained in an environment without a light source (e.g., in a dark room) (step S120). For example, the image sensor may be surrounded by a light shielding member to block light from outside. The image sensor may obtain the at least one test image by capturing the environment without the light source.

Although a relatively dark environment in which the at least one test image is obtained is described with reference to FIGS. 4 and 5, example embodiments are not limited thereto.

Figure 6:
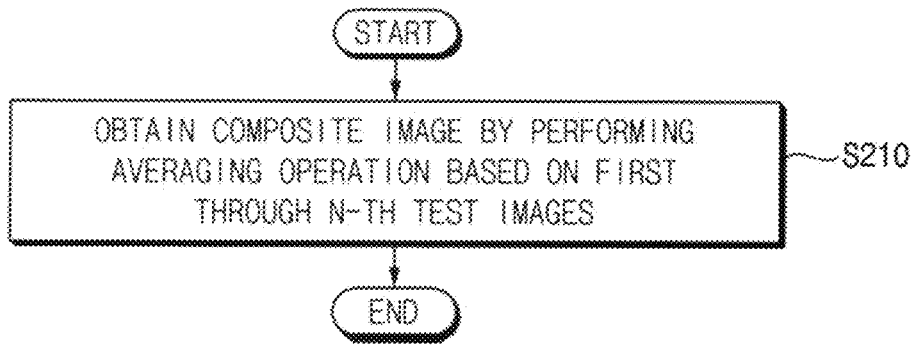
FIG. 6 is a flowchart illustrating an example of generating a composite image in FIG. 1.
Figure 7:
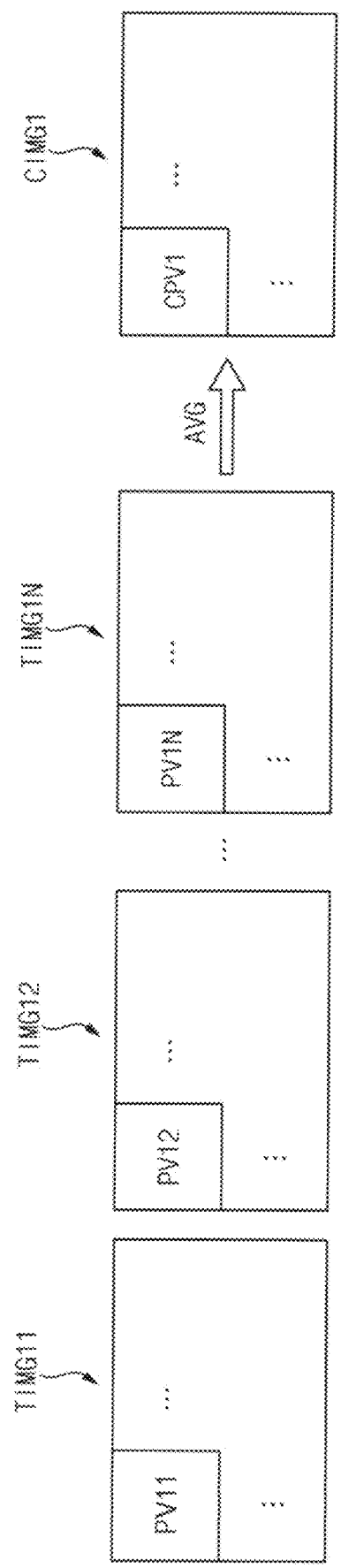
FIG. 7 is a diagram for describing an operation of FIG. 6.

FIG. 6 is a flowchart illustrating an example of generating a composite image in FIG. 1. FIG. 7 is a diagram for describing an operation of FIG. 6.

Referring to FIGS. 1, 6 and 7, when generating the composite image (step S200), the composite image may be obtained using a first test image through an N-th test image that are different from each other, where N is a natural number greater than or equal to two. The first through N-th test images may be obtained by step S100. In other words, FIG. 6 illustrates an example of generating the composite image when N test images are obtained by step S100.

For example, the composite image may be obtained by performing an averaging operation based on the first through N-th test images (step S210). The averaging operation may represent an operation of generating composite pixel values in the composite image by calculating an average of pixel values in the first through N-th test images. In other words, in an example of FIG. 6, the composite image may be an average image that is obtained by averaging the pixel values in the first through N-th test images. One pixel value in each test image may correspond to one composite pixel value in the composite image.

For example, as illustrated in FIG. 7, first through N-th test images TIMG11, TIMG12, ..., TIMG1N may include first through N-th pixel values PV11, PV12, ..., PV1N, respectively. The first through N-th pixel values PV11, PV12, ..., PV1N may correspond to the same position in the first through N-th test images TIMG11, TIMG12, ..., TIMG1N. Each of the first through N-th pixel values PV11, PV12, ..., PV1N may include a grayscale value, a luminance value and/or a brightness value of one pixel.

An averaging operation AVG may be performed on the first through N-th test images TIMG11, TIMG12, ..., TIMG1N to generate a composite image CIMG1. For example, an average value of the first through N-th pixel values PV11, PV12, ..., PV1N may be calculated, and thus a first composite pixel value CPV1 that corresponds to the same position as the first through N-th pixel values PV11, PV12, ..., PV1N and is included in the composite image CIMG1 may be generated (e.g., CPV1=(PV11+PV12+ ... +PV1N)/N).

Although FIG. 7 illustrates that each test image includes one pixel value and the composite image includes one composite pixel value, example embodiments are not limited thereto. For example, each test image may include M pixel values, where M is a natural number greater than or equal to two, and M composite pixel values included in the composite image may be generated by calculating average values of pixel values at the same location in the test images.

Figure 8:
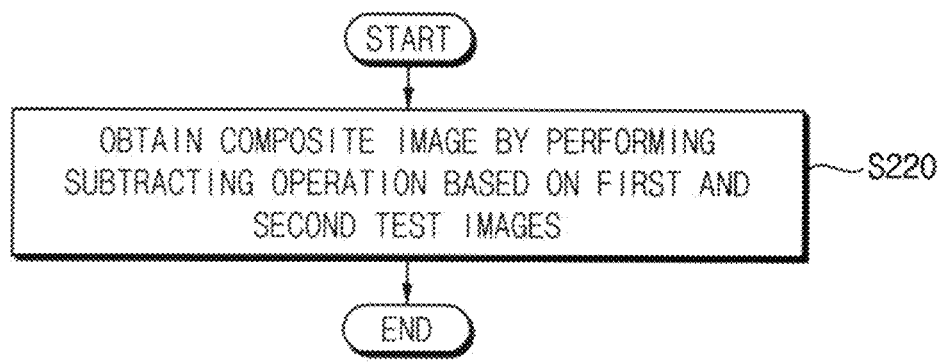
FIG. 8 is a flowchart illustrating another example of generating a composite image in FIG. 1.
Figure 9:
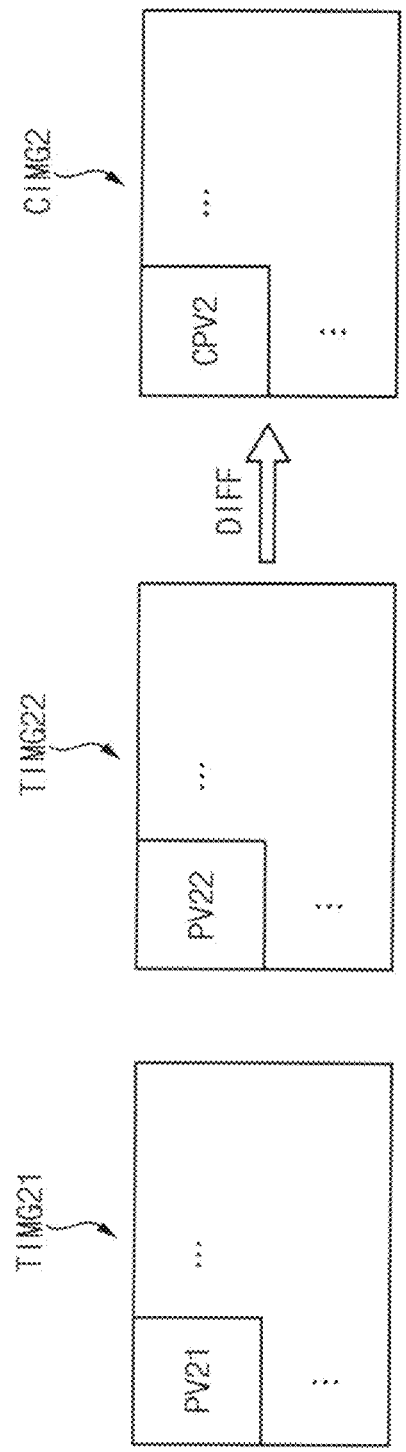
FIG. 9 is a diagram for describing an operation of FIG. 8.

FIG. 8 is a flowchart illustrating another example of generating a composite image in FIG. 1. FIG. 9 is a diagram for describing an operation of FIG. 8. The descriptions repeated with FIGS. 6 and 7 will be omitted.

Referring to FIGS. 1, 8 and 9, when generating the composite image (step S200), the composite image may be obtained using a first test image and a second test image that are different from each other. The first and second test images may be obtained by step S100. In other words, FIG. 8 illustrates an example of generating the composite image when two test images are obtained by step S100.

For example, the composite image may be obtained by performing a subtracting operation based on the first and second test images (step S220). The subtracting operation may represent an operation of generating composite pixel values in the composite image by calculating a difference between pixel values in the first and second test images. In other words, in an example of FIG. 8, the composite image may be a difference image that is obtained by subtracting pixel values in the second test image from pixel values in the first test image.

For example, as illustrated in FIG. 9, first and second test images TIMG21 and TIMG22 may include first and second pixel values PV21 and PV22, respectively. The first and second pixel values PV21 and PV22 may correspond to the same position in the first and second test images TIMG21 and TIMG22.

A subtracting operation DIFF may be performed on the first and second test images TIMG21 and TIMG22 to generate a composite image CIMG2. For example, the second pixel value PV22 may be subtracted from the first pixel value PV21, and thus a first composite pixel value CPV2 that corresponds to the same position as the first and second pixel values PV21 and PV22, and is included in the composite image CIMG2, may be generated (e.g., CPV2=PV21−PV22).

Although FIG. 9 illustrates that the first composite pixel value CPV2 is generated by subtracting the second pixel value PV22 from the first pixel value PV21, example embodiments are not limited thereto. For example, the first composite pixel value CPV2 may be generated by subtracting the first pixel value PV21 from the second pixel value PV22.

Figure 10:
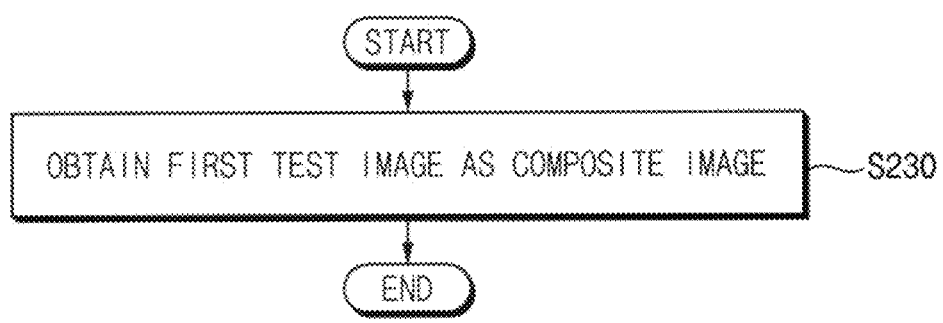
FIG. 10 is a flowchart illustrating still another example of generating a composite image in FIG. 1.
Figure 11:
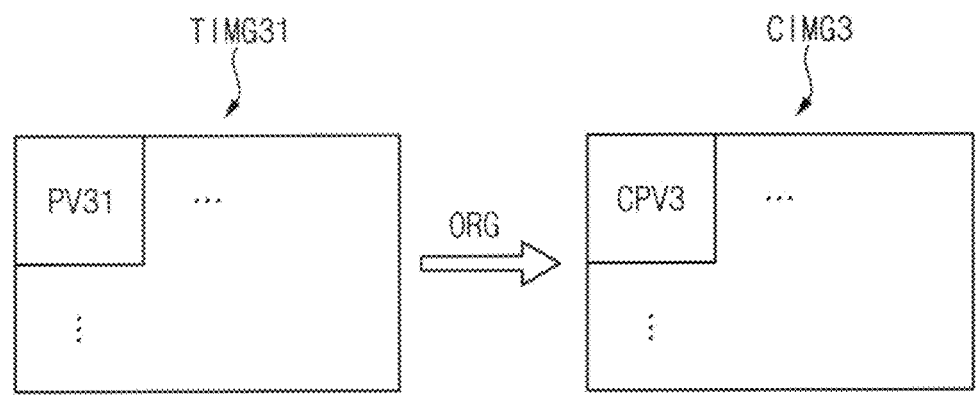
FIG. 11 is a diagram for describing an operation of FIG. 10.

FIG. 10 is a flowchart illustrating still another example of generating a composite image in FIG. 1. FIG. 11 is a diagram for describing an operation of FIG. 10. The descriptions repeated with FIGS. 6 and 7 will be omitted.

Referring to FIGS. 1, 10 and 11, when generating the composite image (step S200), the composite image may be obtained using a first test image. The first test image may be obtained by step S100. In other words, FIG. 10 illustrates an example of generating the composite image when one test image is obtained by step S100.

For example, the first test image itself may be obtained as the composite image (step S230). In other words, in an example of FIG. 10, the composite image may be substantially the same as the first test image.

For example, as illustrated in FIG. 11, a first test image TIMG31 may include a first pixel value PV31. The first test image TIMG31 itself may be generated as a composite image CIMG3 without any conversion and/or synthesis ORG of the first test image TIMG31. For example, the first pixel value PV31 itself may be generated as a first composite pixel value CPV3 that corresponds to the same position as the first pixel value PV31 and is included in the composite image CIMG3 (e.g., CPV3=PV31).

Although examples of generating the composite image are described with reference to FIGS. 6 through 11, example embodiments are not limited thereto.

Figure 12A:
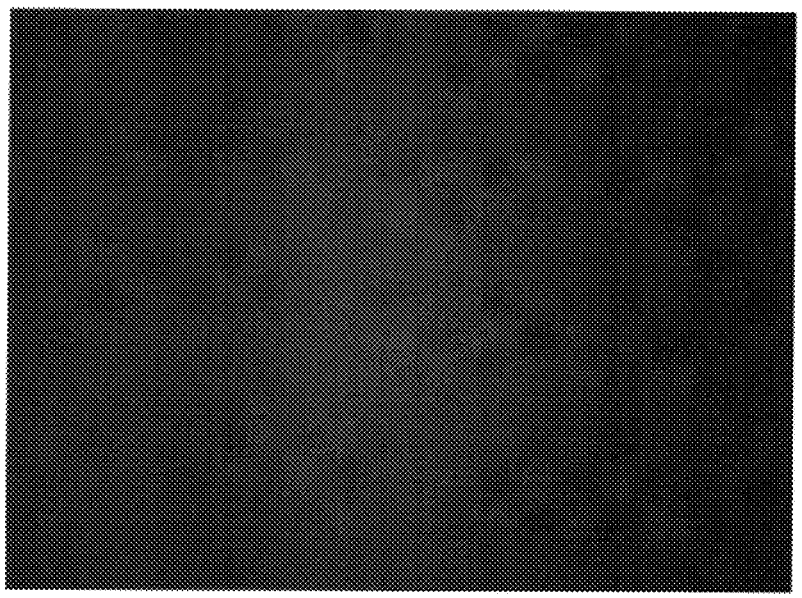
FIGS. 12A and 12B are diagram for describing an example of capturing at least one test image and an example of generating a composite image in FIG. 1.
Figure 12B:
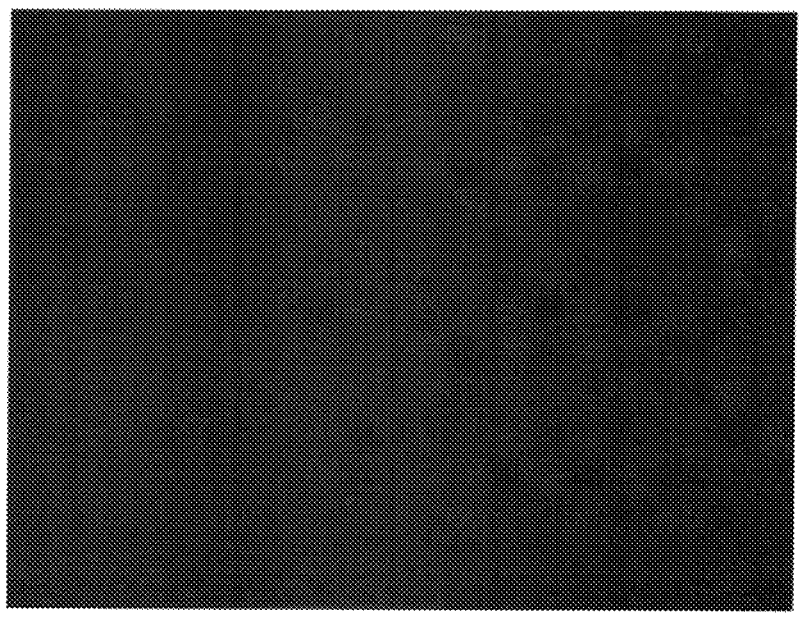

FIGS. 12A and 12B are diagrams for describing an example of capturing at least one test image and an example of generating a composite image in FIG. 1.

Referring to FIG. 12A, one test image obtained by step S100 in FIG. 1 is illustrated. For example, as described with reference to FIG. 5, the test image of FIG. 12A may be an image captured in an environment without a light source.

Referring to FIG. 12B, the composite image obtained by step S200 in FIG. 1 is illustrated. For example, as described with reference to FIGS. 6 and 7, the composite image of FIG. 12B may be an image obtained by averaging N test images.

When the composite image is generated using multiple (i.e., N) test images according to example embodiments, the noise in the test images may be boosted (e.g., a noise boosting effect may occur), and thus an operation of detecting noise and an operation of determining whether the image sensor is defective by step S400 in FIG. 1 may be efficiently performed.

Figure 13:
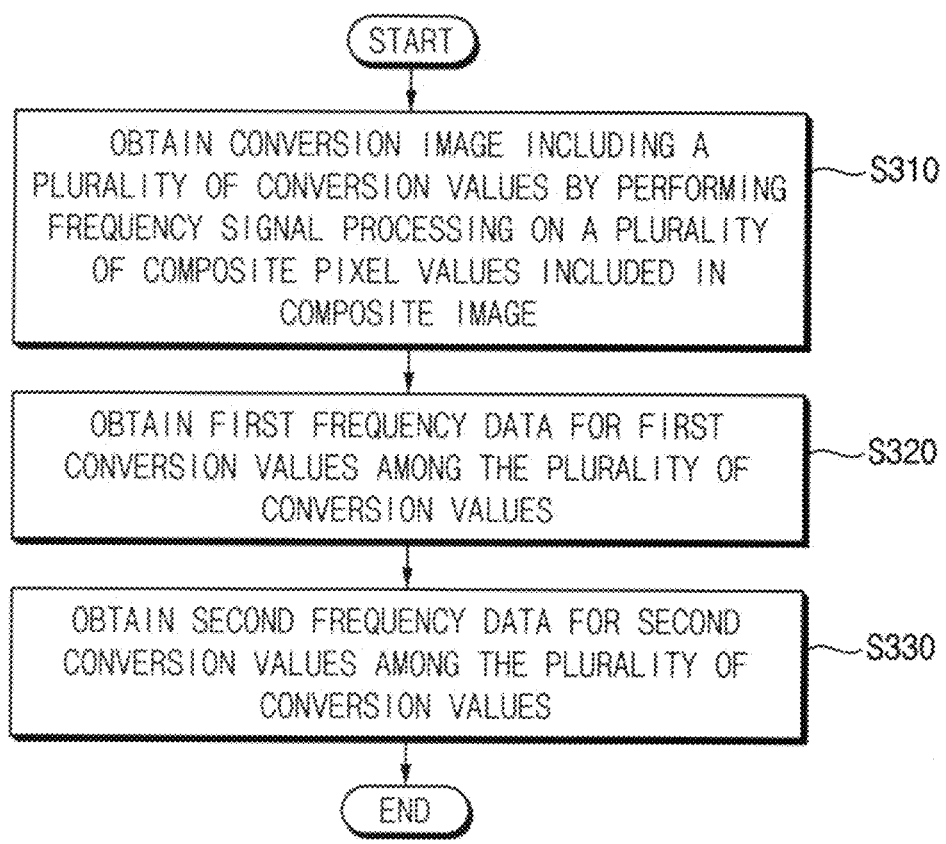
FIG. 13 is a flowchart illustrating an example of generating a plurality of frequency data in FIG. 1.

FIG. 13 is a flowchart illustrating an example of generating a plurality of frequency data in FIG. 1. FIGS. 14A, 14B, 14C and 14D are diagrams for describing an operation of FIG. 13.

Referring to FIGS. 1, 13, 14A, 14B, 14C and 14D, when generating the plurality of frequency data (step S300), a conversion image (or transform image) may be obtained by performing frequency signal processing on a plurality of composite pixel values included in the composite image (step S310). The conversion image may correspond to a frequency domain, and may include a plurality of conversion values. One composite pixel value in the composite image may correspond to one conversion value in the conversion image.

Figure 14A:
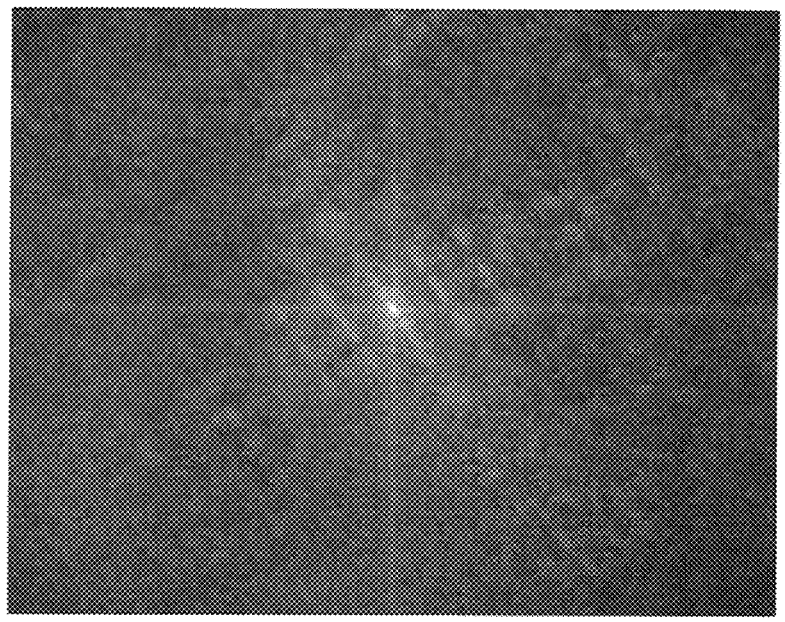
FIGS. 14A, 14B, 14C and 14D are diagrams for describing an operation of FIG. 13.

The frequency signal processing may represent a scheme or method of transforming pixel values or grayscale values into frequency values (or bands) and using the transformed frequency values. The frequency signal processing may be, for example, a wavelet transform or a Fourier transform, or the like. For example, each of the plurality of conversion values may be a result of the Fourier transform. The output of the Fourier transform (i.e., the conversion image) represents the composite image in the frequency domain. FIG. 14A illustrates an example of the conversion image generated based on the Fourier transform. As illustrated in FIG. 14A, each point in the conversion image represents a particular frequency contained in the composite image (i.e., spatial domain image). However, example embodiments are not limited thereto, and at least one of various techniques may be used.

In some example embodiments, the conversion image may be obtained in step S310 by performing the frequency signal processing on composite pixel values having (or corresponding to) the same color among the plurality of composite pixel values. For example, the image sensor may include pixels having different colors, and pixels having the same color may form one channel. In addition, characteristics and corresponding code values may be different for each channel, and frequencies corresponding to each channel may be different. Thus, the conversion image may be generated based on a frequency domain suitable for a frequency corresponding to each channel.

For example, when the image sensor is an RGB sensor, the image sensor may include Gr pixels corresponding to green color, R pixels corresponding to red color, B pixels corresponding to blue color, and Gb pixels corresponding to green color. The Gr pixels, the R pixels, the B pixels and the Gb pixels may form a first channel, a second channel, a third channel and a fourth channel, respectively, and may correspond to a first frequency, a second frequency, a third frequency and a fourth frequency, respectively. For example, the conversion image of FIG. 14A may be an image obtained using only composite pixel values corresponding to the Gr pixels, and may be an image transformed to be suitable for the first channel and the first frequency.

First frequency data for first conversion values among the plurality of conversion values may be obtained (step S320), and second frequency data for second conversion values among the plurality of conversion values may be obtained (step S330).

Figure 14B:
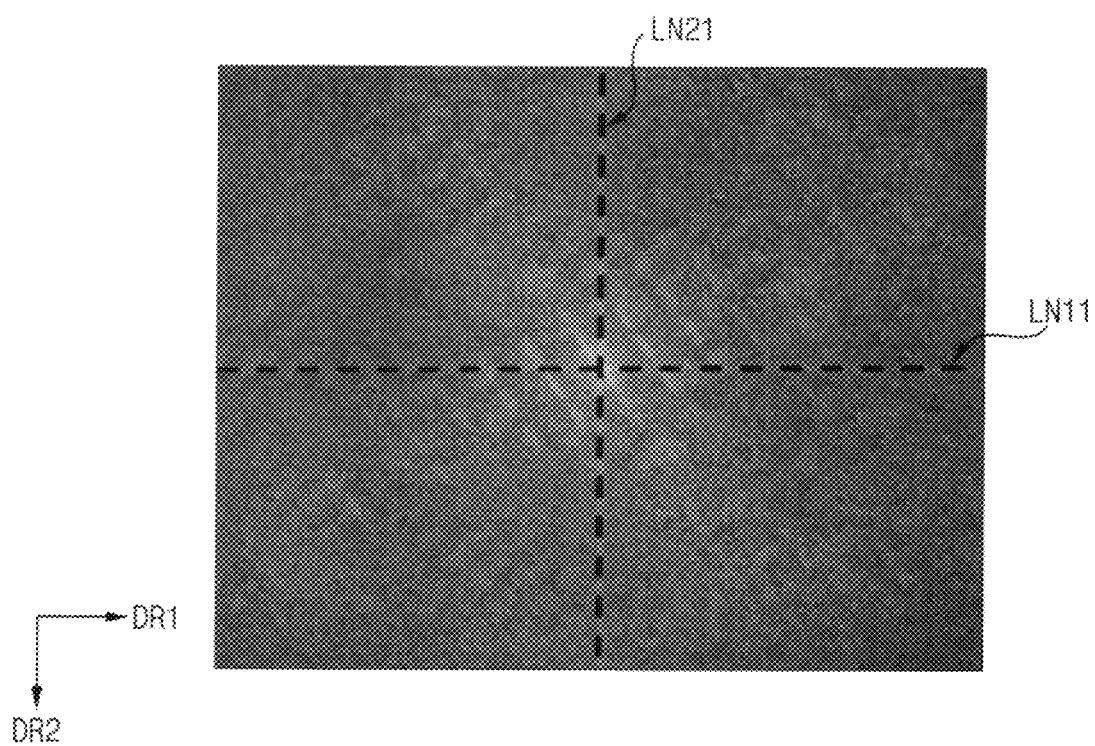

In some example embodiments, as illustrated in FIG. 14B, the first conversion values may be arranged on a first line LN11 extending along a first direction DR1 in the conversion image, and the second conversion values may be arranged on a second line LN21 extending along a second direction DR2 crossing the first direction DR1 in the conversion image.

Figure 14C:
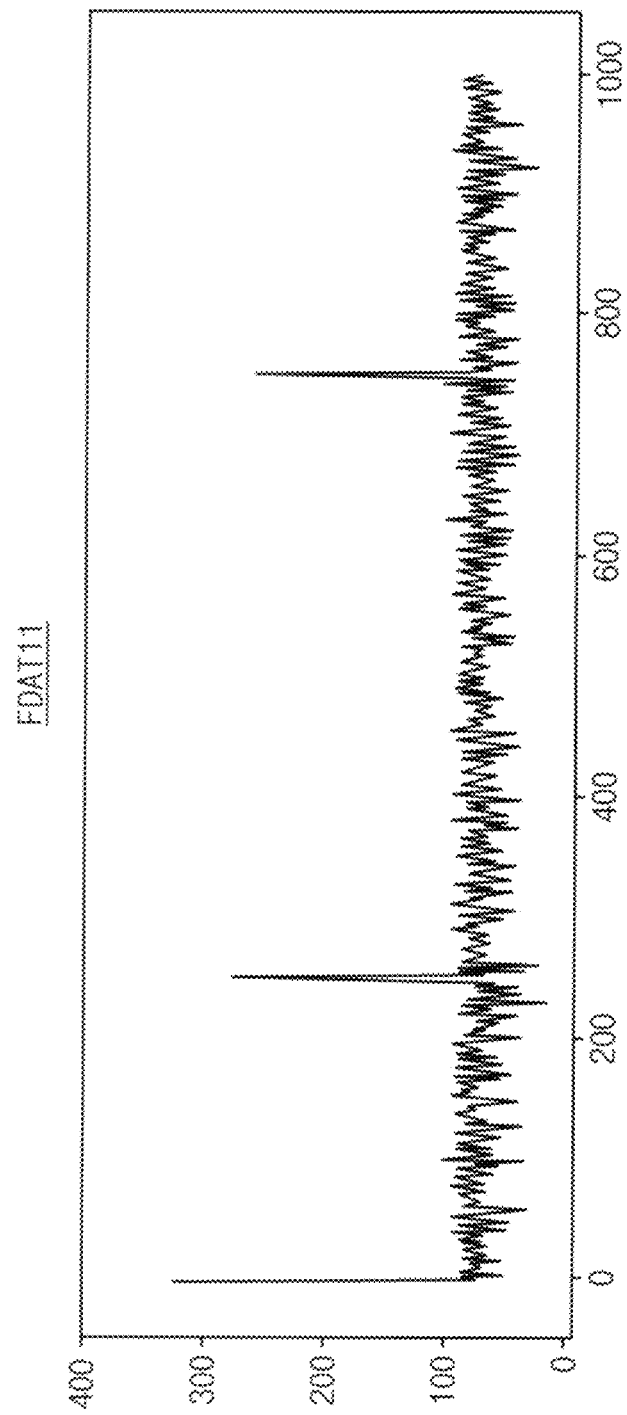
Figure 14D:
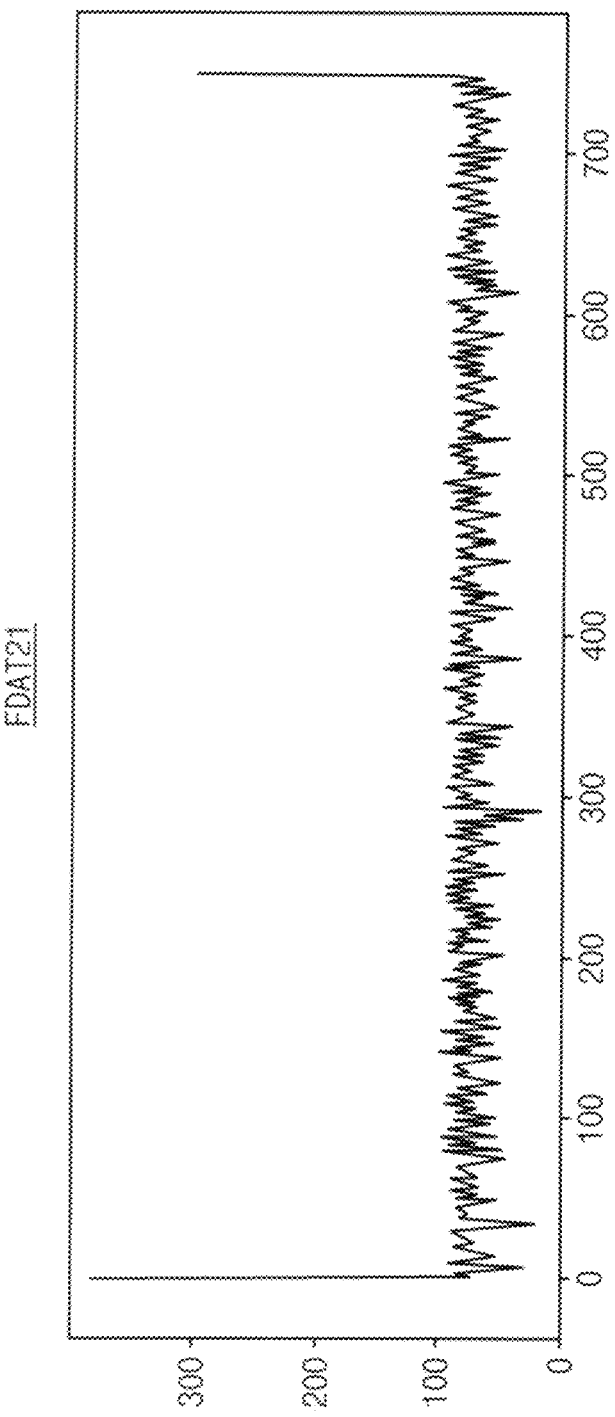

FIG. 14C illustrates first frequency data FDAT11 including the first conversion values arranged on the first line LN11, and FIG. 14D illustrates second frequency data FDAT21 including the second conversion values arranged on the second line LN21. In FIGS. 14C and 14D, a vertical axis represents the conversion value (e.g., a result of the Fourier transform), and a horizontal axis represents a position (or location) of the conversion value in the conversion image. The leftmost position on the first line LN11 may correspond to a position '0' in FIG. 14C, and the uppermost position on the second line LN21 may correspond to a position '0' in FIG. 14D.

The first frequency data FDAT11 of FIG. 14C may represent the change of the conversion values according to the position in the first direction DR1 (e.g., in a row direction or a horizontal direction), and the presence of the vertical noise may be detected using the first frequency data FDAT11. Similarly, the second frequency data FDAT21 of FIG. 14D may represent the change of the conversion values according to the position in the second direction DR2 (e.g., in a column direction or a vertical direction), and the presence of the horizontal noise may be detected using the second frequency data FDAT21.

For example, each of the first frequency data FDAT11 of FIG. 14C and the second frequency data FDAT21 of FIG. 14D may be frequency data obtained using the conversion image that is obtained using only the composite pixel values corresponding to the Gr pixels, and may be frequency data corresponding to the first channel and the first frequency.

Although FIG. 13 illustrates that one conversion image and frequency data corresponding thereto are generated, example embodiments are not limited thereto. For example, conversion images and frequency data may be generated for each pixel and channel having a different color. For example, when the image sensor is an RGB sensor, a first conversion image may be obtained using only the composite pixel values corresponding to the Gr pixels, and the frequency data corresponding to the first channel and the first frequency may be obtained based on the first conversion image. Similarly, a second conversion image may be obtained using only composite pixel values corresponding to the R pixels, and frequency data corresponding to the second channel and the second frequency may be obtained based on the second conversion image. A third conversion image may be obtained using only composite pixel values corresponding to the B pixels, and frequency data corresponding to the third channel and the third frequency may be obtained based on the third conversion image. In addition, a fourth conversion image may be obtained using only composite pixel values corresponding to the Gb pixels, and frequency data corresponding to the fourth channel and the fourth frequency may be obtained based on the fourth conversion image.

Figure 15:
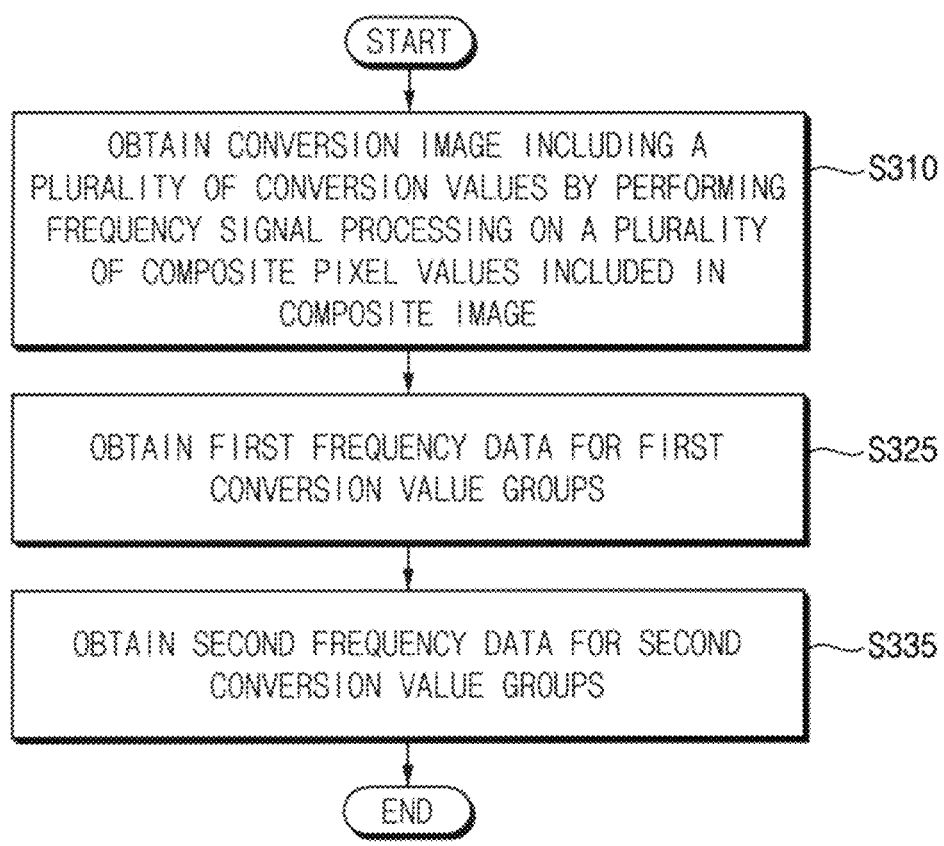
FIG. 15 is a flowchart illustrating another example of generating a plurality of frequency data in FIG. 1.
Figure 16:
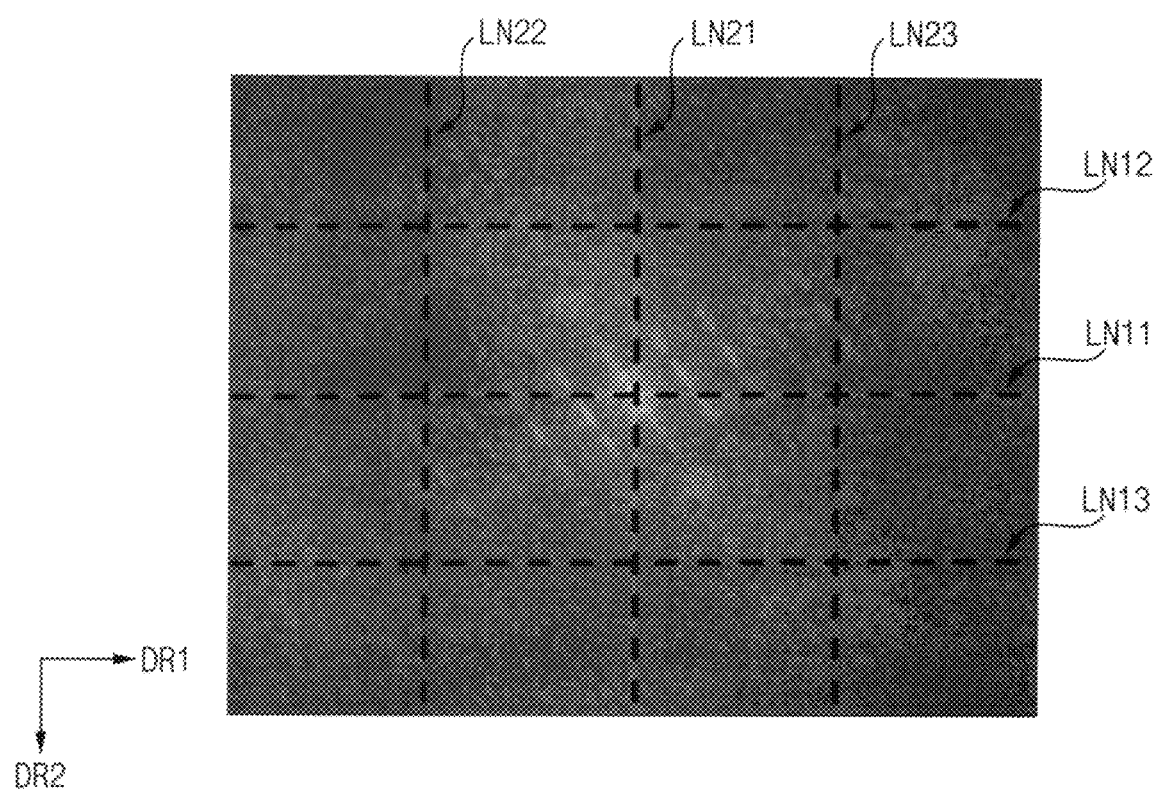
FIG. 16 is a diagram for describing an operation of FIG. 15.

FIG. 15 is a flowchart illustrating another example of generating a plurality of frequency data in FIG. 1. FIG. 16 is a diagram for describing an operation of FIG. 15. The descriptions repeated with FIGS. 13, 14A, 14B, 14C and 14D will be omitted.

Referring to FIGS. 1, 15 and 16, when generating the plurality of frequency data (step S300), step S310 may be substantially the same as step S310 in FIG. 13.

First frequency data for first conversion value groups may be obtained (step S325), and second frequency data for second conversion value groups may be obtained (step S335). Each of the first conversion value groups may include first conversion values among the plurality of conversion values, and the first conversion value groups may include the conversion values of the same number (e.g., a first number or quantity). Each of the second conversion value groups may include second conversion values among the plurality of conversion values, and the second conversion value groups may include the conversion values of the same number (e.g., a second number or quantity).

In some example embodiments, as illustrated in FIG. 16, the first conversion values included in the first conversion value groups may be arranged on first lines LN11, LN12 and LN13 extending along the first direction DR1 in the conversion image. For example, the conversion values arranged on the first line LN11 may be included in a first one of the first conversion value groups and a first one of the first frequency data, the conversion values arranged on the first line LN12 may be included in a second one of the first conversion value groups and a second one of the first frequency data, and the conversion values arranged on the first line LN13 may be included in a third one of the first conversion value groups and a third one of the first frequency data. In other words, one line in the conversion image may correspond to one frequency data. Each of the first frequency data may be similar to the first frequency data FDAT11 of FIG. 14C.

Similarly, the second conversion values included in the second conversion value groups may be arranged on second lines LN21, LN22 and LN23 extending along the second direction DR2 in the conversion image. Each of the second frequency data may be similar to the second frequency data FDAT21 of FIG. 14D.

In some example embodiments, an operation of detecting noise and an operation of determining whether the image sensor is defective by step S400 in FIG. 1 may be performed using all the first frequency data and all the second frequency data. In other example embodiments, first average frequency data may be obtained by averaging the first frequency data, second average frequency data may be obtained by averaging the second frequency data, and an operation of detecting noise and an operation of determining whether the image sensor is defective by step S400 in FIG. 1 may be performed using the first average frequency data and the second average frequency data.

Although FIG. 16 illustrates that three first frequency data and three second frequency data are obtained, example embodiments are not limited thereto, and the number of the first frequency data and the number of the second frequency data may be changed according to example embodiments. For example, the first frequency data may be obtained for all rows of the conversion image, and the second frequency data may be obtained for all columns of the conversion image.

Although FIGS. 14B and 16 illustrate that the first direction DR1 is the row direction or the horizontal direction, and the second direction DR2 is the column direction or the vertical direction, example embodiments are not limited thereto, and the first and second directions may be changed according to example embodiments. For example, the first direction and/or the second direction may be a diagonal direction or any other direction.

Although FIGS. 14C and 14D illustrate that the first and second frequency data FDAT11 and FDAT21 are obtained in the form of graphs, example embodiments are not limited thereto, and the first and second frequency data may be obtained in various forms. For example, the first frequency data and/or the second frequency data may be obtained in a vector form.

Figure 17:
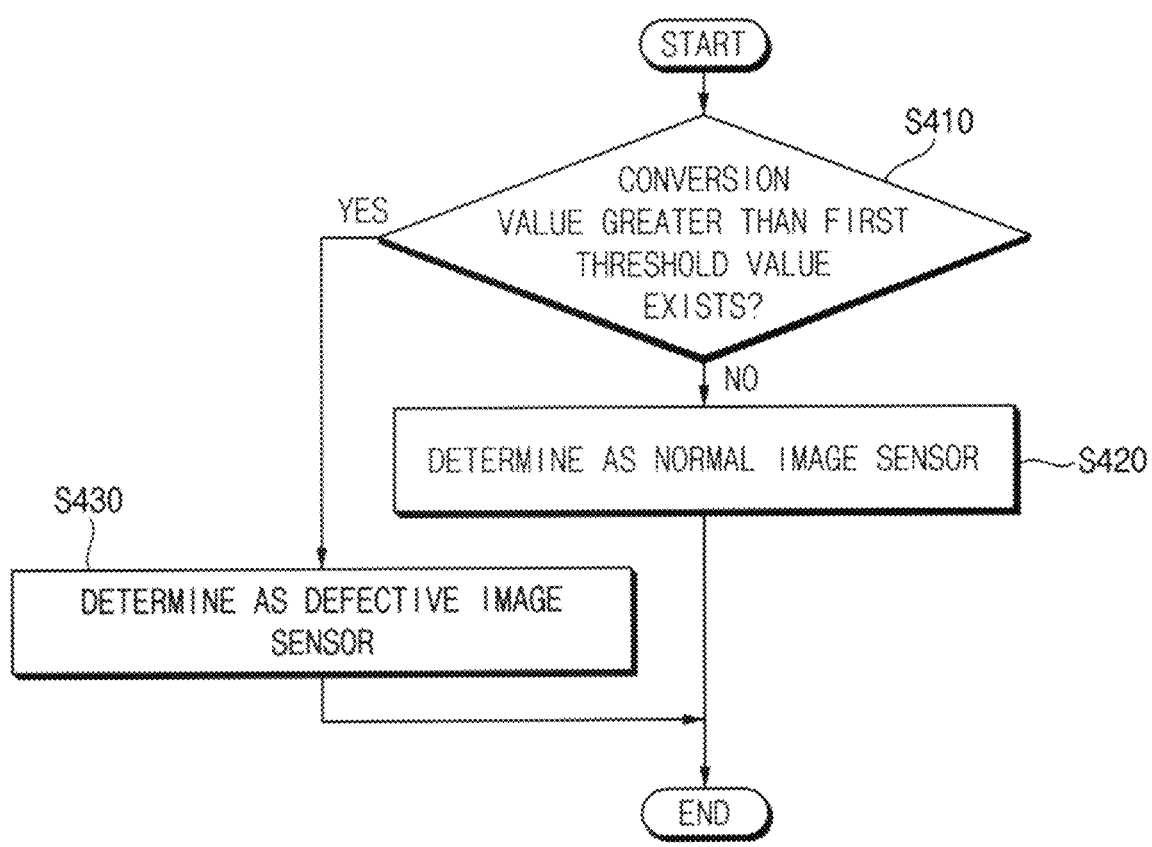
FIG. 17 is a flowchart illustrating an example of determining whether an image sensor is defective in FIG. 1.
Figure 18:
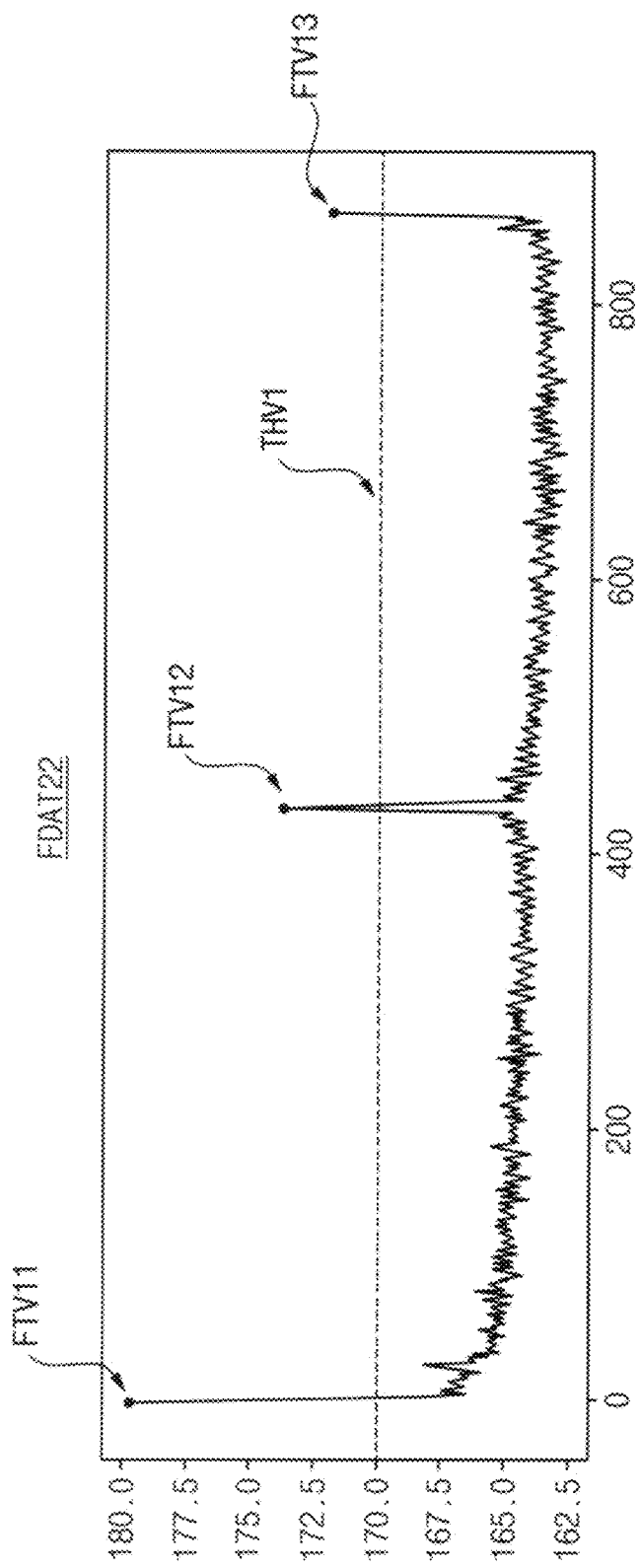
FIG. 18 is a diagram for describing an operation of FIG. 17.

FIG. 17 is a flowchart illustrating an example of determining whether an image sensor is defective in FIG. 1. FIG. 18 is a diagram for describing an operation of FIG. 17.

Referring to FIGS. 1, 17 and 18, when determining whether the image sensor is defective (step S400), one of the plurality of frequency data may be selected, and it may be determined, based on conversion values included in the selected frequency data and a first threshold value, whether the image sensor is defective.

For example, each of the conversion values included in the selected frequency data may be compared with the first threshold value. When a conversion value greater than the first threshold value exists (step S410: YES), e.g., when a first conversion value among the conversion values included in the selected frequency data is greater than the first threshold value, the image sensor may be determined as a defective image sensor (or it may be determined that the image sensor has a defect) (step S430). When a conversion value greater than the first threshold value does not exist (step S410: NO), e.g., when all of the conversion values included in the selected frequency data are smaller than or equal to the first threshold value, the image sensor may be determined as a normal (i.e., functionally operational) image sensor (or it may be determined that the image sensor does not have a defect) (step S420).

In some example embodiments, FIG. 18 illustrates second frequency data FDAT22 obtained by step S330 in FIG. 13 or step S335 in FIG. 15. Among the plurality of conversion values included in the second frequency data FDAT22, conversion values FTV11, FTV12 and FTV13 may be greater than a first threshold value THV1, and thus the image sensor from which the second frequency data FDAT22 is obtained may be determined as a defective image sensor.

In some example embodiments, the plurality of frequency data may be sequentially selected, and it may be determined, by sequentially analyzing the selected frequency data, whether the image sensor is defective. In other words, steps S410, S420 and S430 may be sequentially performed on the plurality of frequency data. In some example embodiments, the same threshold value may be used for all of the plurality of frequency data, and/or different threshold values may be used for at least some of the plurality of frequency data. The image sensor may be determined as a normal image sensor when 'NO' in step S410 is satisfied for all of the plurality of frequency data. The image sensor may be determined as a defective image sensor when 'YES' in step S410 is satisfied for even one of the plurality of frequency data.

Although FIG. 17 illustrates that it is determined, based on the frequency data for one conversion image, whether the image sensor is defective, example embodiments are not limited thereto. For example, it may be determined, based on frequency data for conversion images corresponding to pixels and channels having different colors, whether the image sensor is defective. For example, when the image sensor is an RGB sensor, steps S410, S420 and S430 may be performed based on the frequency data for the first conversion image corresponding to the Gr pixels and the first channel. Similarly, steps S410, S420 and S430 may be performed based on the frequency data for the second conversion image corresponding to the R pixels and the second channel. Steps S410, S420 and S430 may be performed based on the frequency data for the third conversion image corresponding to the B pixels and the third channel. In addition, steps S410, S420 and S430 may be performed based on the frequency data for the fourth conversion image corresponding to the Gb pixels and the fourth channel. The image sensor may be determined as a normal image sensor when it is determined as a normal image sensor in all above-described cases. The image sensor may be determined as a defective image sensor when it is determined as a defective image sensor even once in the above-described cases.

Figure 19:
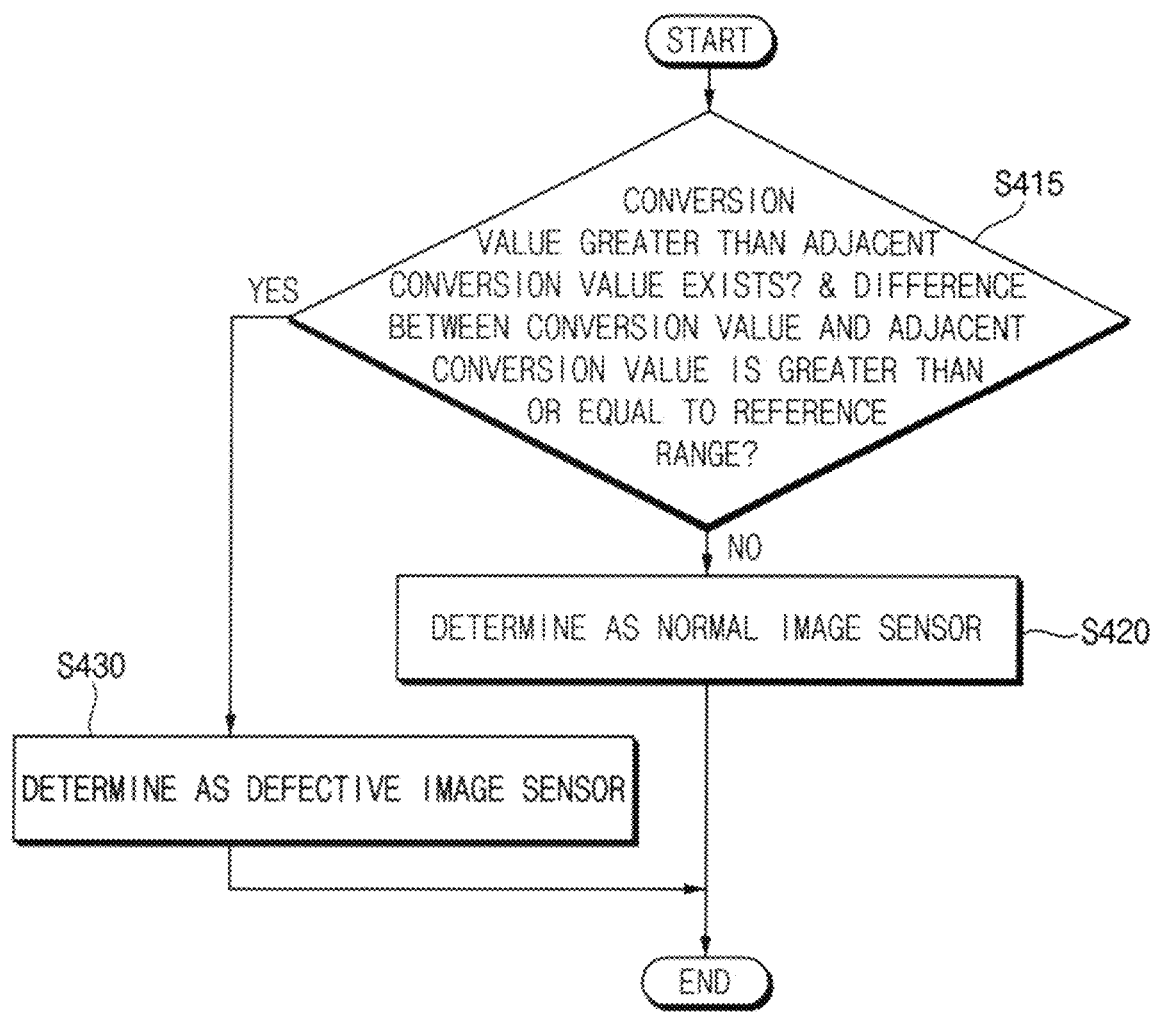
FIG. 19 is a flowchart illustrating another example of determining whether an image sensor is defective in FIG. 1.
Figure 20:
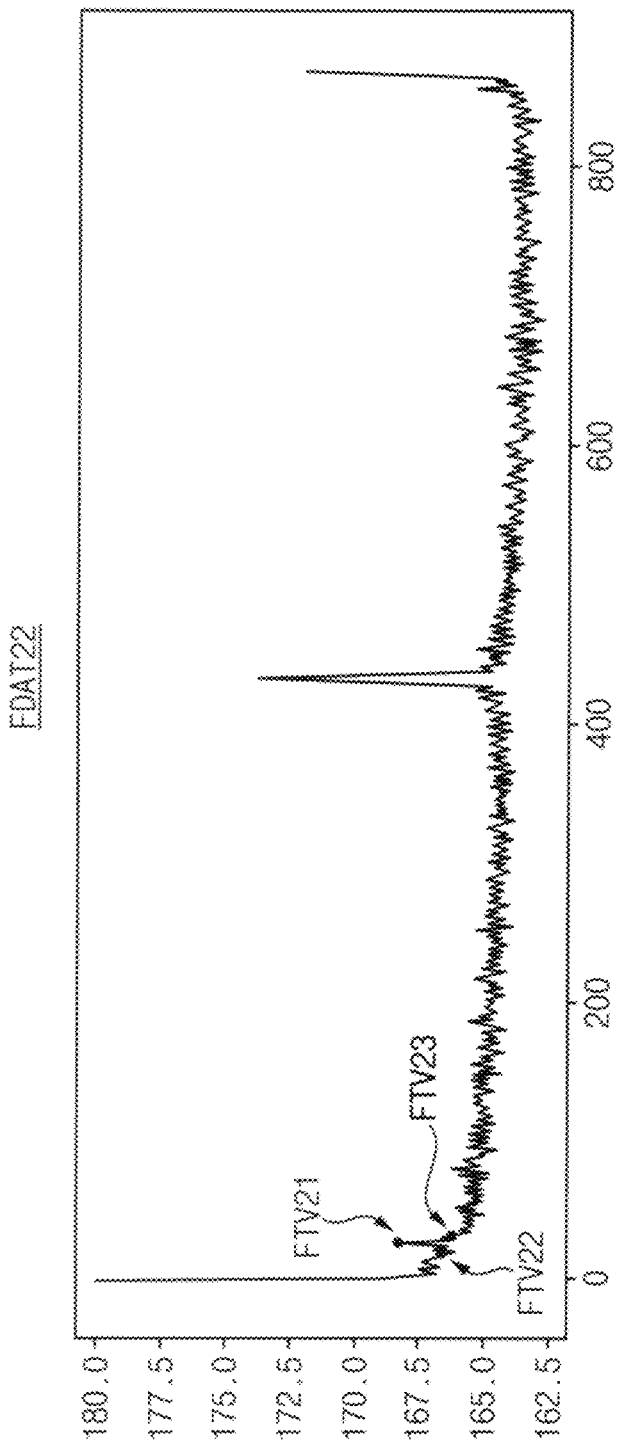
FIG. 20 is a diagram for describing an operation of FIG. 19.

FIG. 19 is a flowchart illustrating another example of determining whether an image sensor is defective in FIG. 1. FIG. 20 is a diagram for describing an operation of FIG. 19. The descriptions repeated with FIGS. 17 and 18 will be omitted.

Referring to FIGS. 1, 19 and 20, when determining whether the image sensor is defective (step S400), one of the plurality of frequency data may be selected, and it may be determined, based on conversion values included in the selected frequency data, whether the image sensor is defective.

For example, each of the conversion values included in the selected frequency data may be compared with conversion values (e.g., adjacent conversion values) adjacent to each of the conversion values. When a conversion value greater than the adjacent conversion value exists and when a difference between the conversion value and the adjacent conversion value is greater than or equal to a reference range (step S415: YES), e.g., when a first conversion value among the conversion values included in the selected frequency data is greater than a second conversion value that is the adjacent conversion value and when a difference between the first conversion value and the second conversion value is greater than or equal to the reference range, the image sensor may be determined as a defective image sensor (or it may be determined that the image sensor has a defect) (step S430). When the conversion value greater than the adjacent conversion value does not exist or when the difference between the conversion value and the adjacent conversion value is smaller than the reference range (step S415: NO), e.g., when the first conversion value is smaller than or equal to the second conversion value or when the difference between the first conversion value and the second conversion value is smaller than the reference range, the image sensor may be determined as a normal image sensor (or it may be determined that the image sensor does not have a defect) (step S420).

In some example embodiments, the reference range may correspond to an absolute value. For example, it may be determined in step S415 whether each conversion value (e.g., a conversion value FTV1) is greater than the adjacent conversion value (e.g., an adjacent conversion value FTV2) by a first value V1 (e.g., FTV1>FTV2+V1).

In other example embodiments, the reference range may correspond to a ratio. For example, it may be determined in step S415 whether each conversion value (e.g., the conversion value FTV1) is greater than the adjacent conversion value (e.g., an adjacent conversion value FTV2) by a first ratio R1 (e.g., FTV1>FTV2*R1).

In some example embodiments, FIG. 20 illustrates second frequency data FDAT22 obtained by step S330 in FIG. 13 or step S335 in FIG. 15. The second frequency data FDAT22 of FIG. 20 may be substantially the same as the second frequency data FDAT22 of FIG. 18. Among the plurality of conversion values included in the second frequency data FDAT22, the conversion value FTV21 may be greater than the adjacent conversion values FTV22 and FTV23, a difference between the conversion value FTV21 and the adjacent conversion value FTV22 and/or a difference between the conversion value FTV21 and the adjacent conversion value FTV23 may be greater than the reference range, and thus the image sensor from which the second frequency data FDAT22 is obtained may be determined as a defective image sensor.

Although the band pattern noise corresponding to the conversion value FTV21 in FIG. 20 is not detected by a conventional test method, the band pattern noise may be efficiently detected when the frequency domain is used according to example embodiments.

In some example embodiments, steps S415, S420 and S430 may be sequentially performed on the plurality of frequency data.

Although FIGS. 17 and 19 are described as separate examples, example embodiments are not limited thereto, and example embodiments may be implemented by combining both the examples of FIGS. 17 and 19. For example, it may be determined whether the image sensor is defective by performing both a first comparing operation in which the conversion values included in the selected frequency data are compared with the first threshold value and a second comparing operation in which the conversion values included in the selected frequency data are compared with the adjacent conversion values.

Figure 21A:
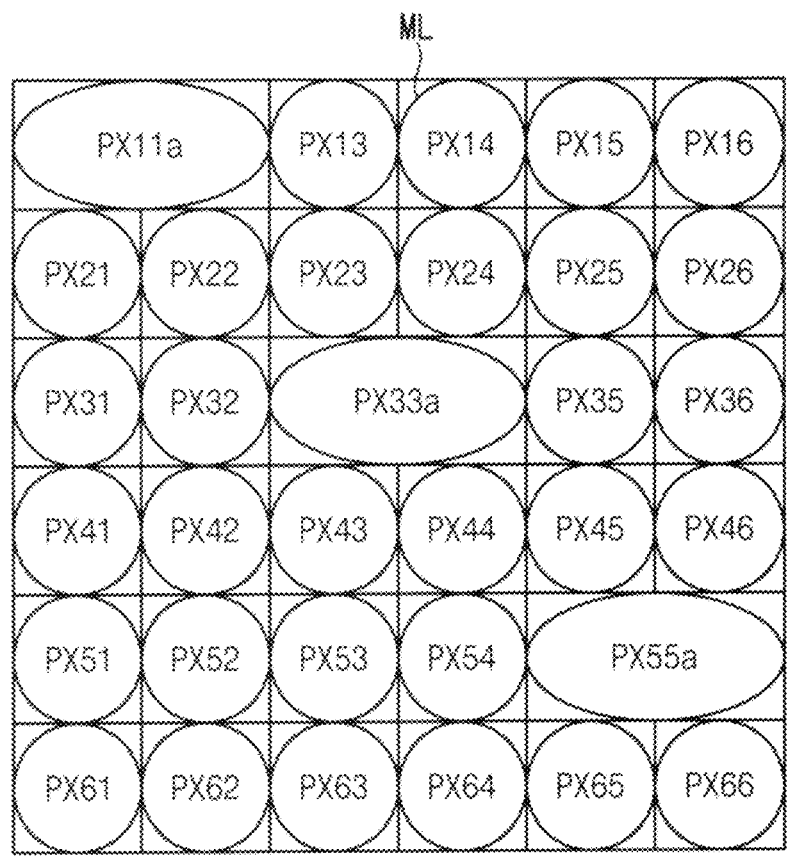
FIGS. 21A and 21B are diagrams illustrating another example of a pixel array and a pixel included in an image sensor of FIG. 2.
Figure 21B:
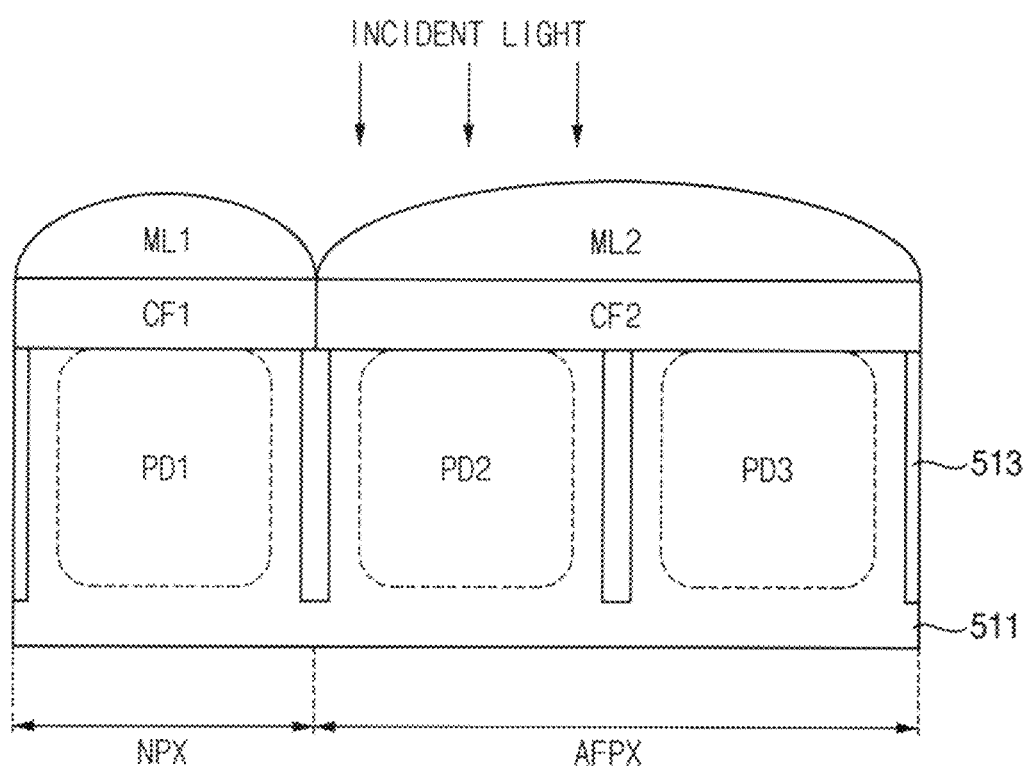

FIGS. 21A and 21B are diagrams illustrating another example of a pixel array and a pixel included in an image sensor of FIG. 2. The descriptions repeated with FIGS. 3A and 3B will be omitted.

FIG. 21A is a plan view of an example of a pixel array included in the image sensor 500 of FIG. 2 when the image sensor 500 is an auto-focus image sensor. FIG. 21B is a cross-sectional view of an example of pixels included in the pixel array of FIG. 21A.

Referring to FIG. 21A, a pixel array 514 included in an auto-focus image sensor may include a plurality of pixels PX11a, PX13, PX14, PX15, PX16, PX21, PX22, PX23, PX24, PX25, PX26, PX31, PX32, PX33a, PX35, PX36, PX41, PX42, PX43, PX44, PX45, PX46, PX51, PX52, PX53, PX54, PX55a, PX61, PX62, PX63, PX64, PX65 and PX66.

The plurality of pixels PX11a, PX13 through PX16, PX21 through PX26, PX31, PX32, PX33a, PX35, PX36, PX41 through PX46, PX51 through PX54, PX55a, and PX61 through PX66 may include first pixels that detect an image and second pixels that detect a phase difference. The first pixels may be referred to as normal pixels, and the second pixels may be referred to as auto-focus (AF) pixels. In other words, in the auto-focus image sensor, the AF pixels for obtaining AF information and the normal pixels may be disposed in one pixel array 514. In an example of FIG. 21A, the pixels PX11a, PX33a and PX55a may be the AF pixels, and the remaining pixels PX13 through PX16, PX21 through PX26, PX31, PX32, PX35, PX36, PX41 through PX46, PX51 through PX54, and PX61 through PX66 may be the normal pixels.

The pixel array 514 may be substantially the same as the pixel array 512 of FIG. 3A, except that the normal pixels PX11, PX12, PX33, PX34, PX55 and PX56 in FIG. 3A are changed to the AF pixels PX11a, PX33a and PX55a. The auto-focus image sensor including the pixel array 514 may have a structure substantially the same as the structure illustrated in FIG. 3. A micro lens of the AF pixel (e.g., the pixel PX33a) may have a size greater than that of a micro lens of the normal pixel (e.g., the pixel PX32). The size of the pixel array 514 and the number of the pixels may be changed according to example embodiments.

Referring to FIG. 21B, a first pixel (or normal pixel) NPX may include a first photoelectric conversion region PD1, a first color filter CF1 and a first micro lens ML1. For example, the first pixel NPX may correspond to the pixel PX32 in FIG. 21A, and may be substantially the same as the first pixel NPX in FIG. 3B.

A second pixel (or AF pixel) AFPX may include a second photoelectric conversion region PD2, a third photoelectric conversion region PD3, a second color filter CF2 and a second micro lens ML2. For example, the second pixel AFPX may correspond to the pixel PX33a in FIG. 21A.

The second and third photoelectric conversion regions PD2 and PD3 may be formed in a substrate 511. The second color filter CF2 may be formed on the second and third photoelectric conversion regions PD2 and PD3, and may be shared by the second and third photoelectric conversion regions PD2 and PD3. In some example embodiments, the second color filter CF2 may include two color filters that have the same color and formed on the second and third photoelectric conversion regions PD2 and PD3, respectively. The second micro lens ML2 may be formed on the second color filter CF2, and may be shared by the second and third photoelectric conversion regions PD2 and PD3.

In some example embodiments, the first, second and third photoelectric conversion regions PD1, PD2 and PD3 may have the same size (e.g., the same area in a plan view or on a plane). Thus, a size (e.g., an area in a plan view) of the second micro lens ML2 shared by the second and third photoelectric conversion regions PD2 and PD3 may be larger than a size of the first micro lens ML1. For example, the size of the second micro lens ML2 may be about twice the size of the first micro lens ML1.

In some example embodiments, the AF pixels and the normal pixels included in the pixel array 514 may have the same color filter arrangement structure. However, the color filters disposed on the AF pixels may not be used to form colors (e.g., to generate pixel values corresponding to a specific color), and the color filters may be disposed on the AF pixels only for convenience of a process of manufacturing the color filter array. In addition, the color filters corresponding to each AF pixel in the pixel array 514 may have the same color to better allow for the accuracy of AF information.

As described with reference to FIGS. 21A and 21B, the first pixel NPX and the second pixel AFPX may have the same pixel structure and circuit structure (e.g., the circuit structure in FIG. 3C), except that configurations of micro lenses and color filters are different from each other.

FIGS. 22A, 22B, 23A and 23B are diagrams for describing a method of testing an image sensor according to example embodiments.

Figure 22A:
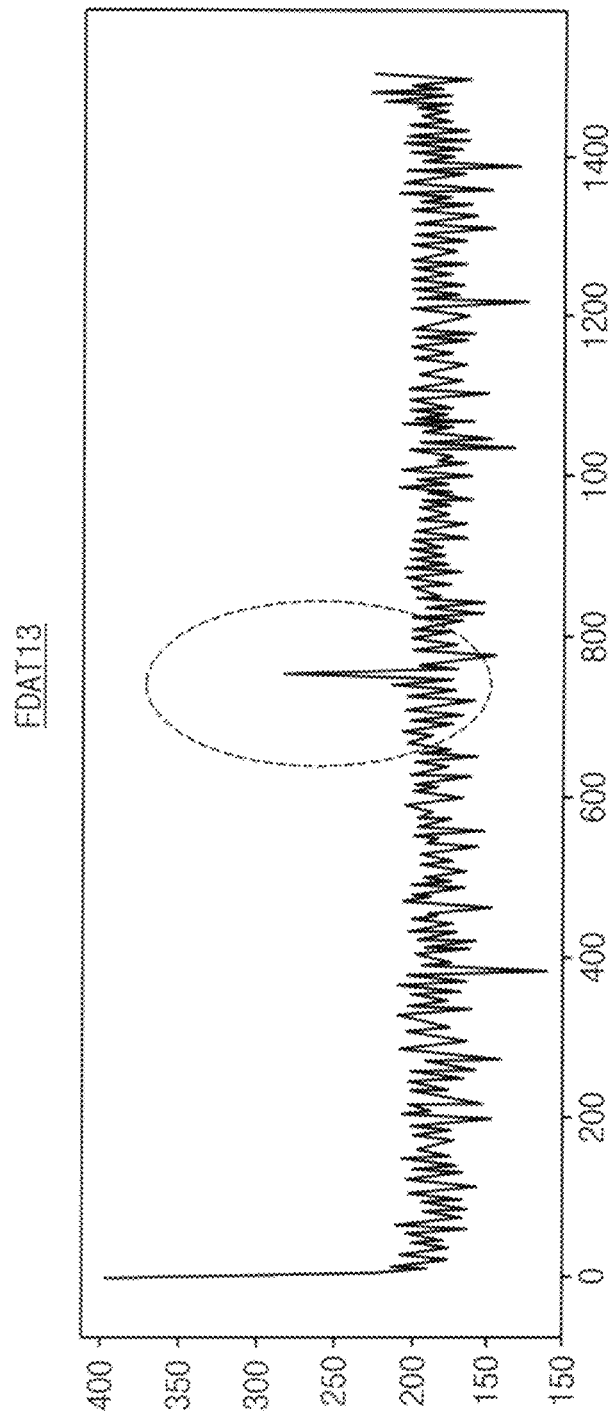
FIGS. 22A, 22B, 23A and 23B are diagrams for describing a method of testing an image sensor according to example embodiments.
Figure 22B:
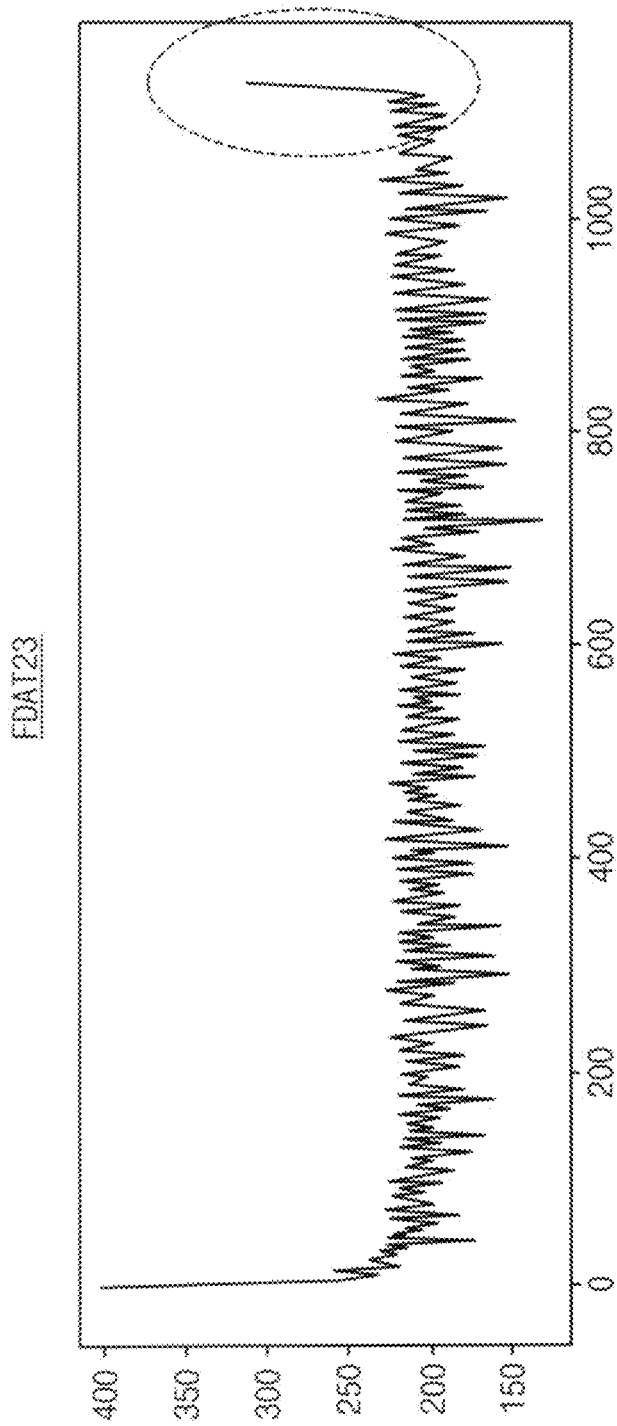

Referring to FIGS. 22A and 22B, first frequency data FDAT13 obtained by step S320 in FIG. 13 or step S325 in FIG. 15 is illustrated, and second frequency data FDAT23 obtained by step S330 in FIG. 13 or step S335 in FIG. 15 is illustrated. The first and second frequency data FDAT13 and FDAT23 may be obtained from an auto-focus image sensor (e.g., the auto-focus image sensor including the pixel array 514 of FIG. 21A).

A portion indicated by dotted lines in FIGS. 22A and 22B may be noise having an unusual (i.e., non-repeating) pattern. As a result of the noise having the unusual pattern, the noise is not detected by a conventional test method. However, the noise having the unusual pattern may be efficiently detected when the frequency domain is used according to example embodiments.

Figure 23A:
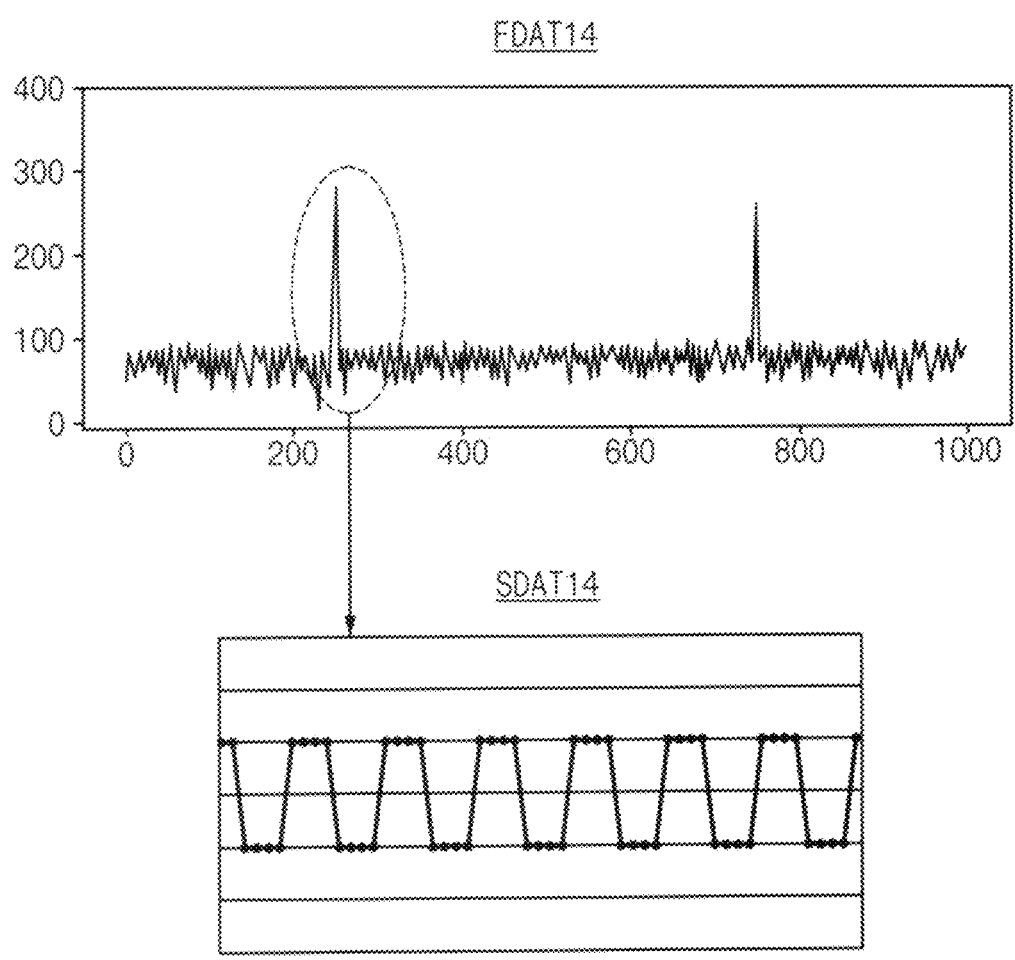
Figure 23B:
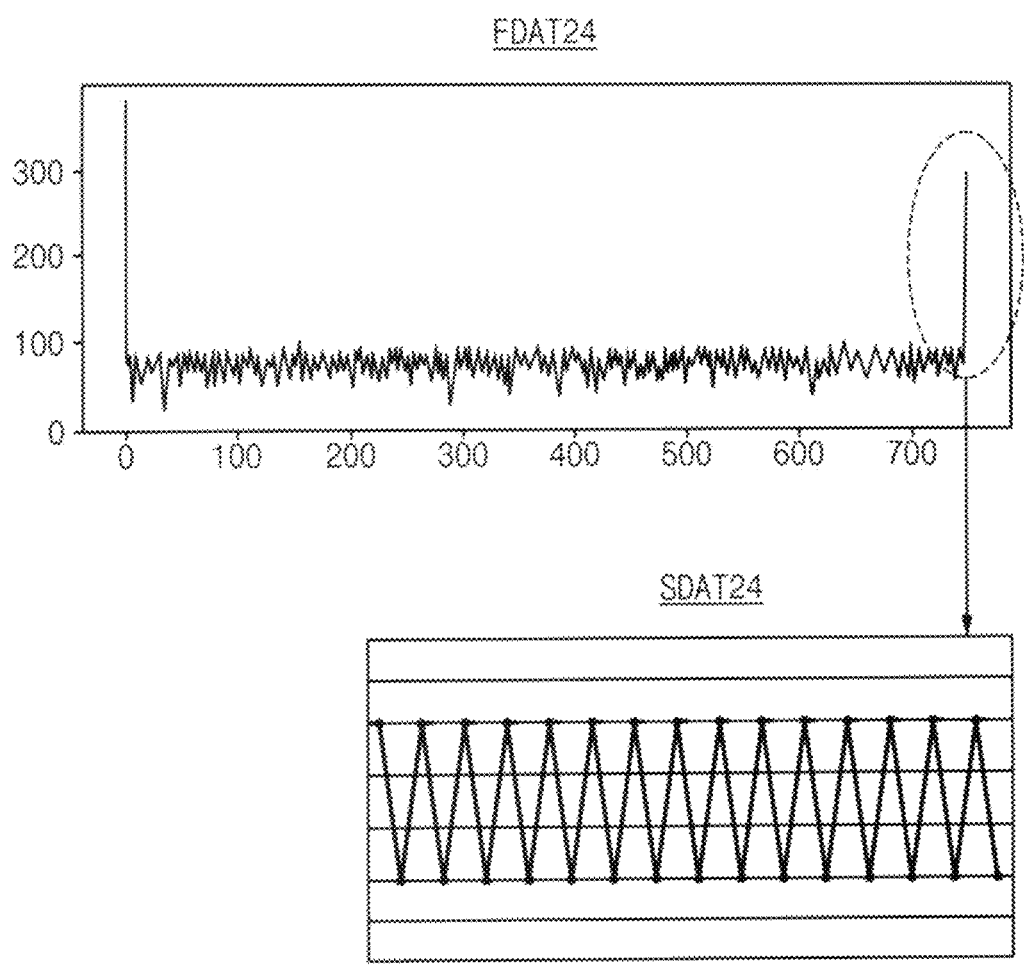

Referring to FIGS. 23A and 23B, first frequency data FDAT14 obtained by step S320 in FIG. 13 or step S325 in FIG. 15 is illustrated, and second frequency data FDAT24 obtained by step S330 in FIG. 13 or step S335 in FIG. 15 is illustrated. In addition, in FIGS. 23A and 23B, first spatial data SDAT14 of the composite image corresponding to a portion indicated by dotted lines in the first frequency data FDAT14 is illustrated, and second spatial data SDAT24 of the composite image corresponding to a portion indicated by dotted lines in the second frequency data FDAT24 is illustrated.

When the frequency domain is used according to example embodiments, the analysis of the noise may be performed by separating the vertical noise (or column noise) illustrated in FIG. 23A and the horizontal noise (or row noise) illustrated in FIG. 23B. For example, FIG. 23A illustrates the column noise occurred every two lines, and FIG. 23B illustrates the row noise occurred every one line.

Although not illustrated in FIGS. 22A, 22B, 23A and 23B, various other noises having high visibility in a specific environment may be efficiently detected when the frequency domain is used according to example embodiments.

Figure 24:
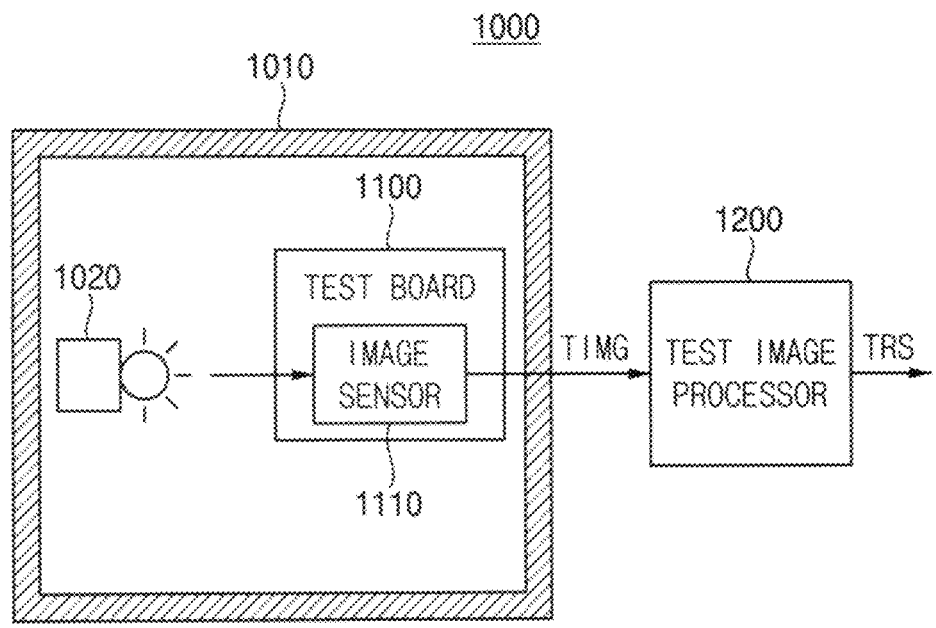
FIGS. 24 and 25 are block diagrams illustrating a test system according to example embodiments.
Figure 25:
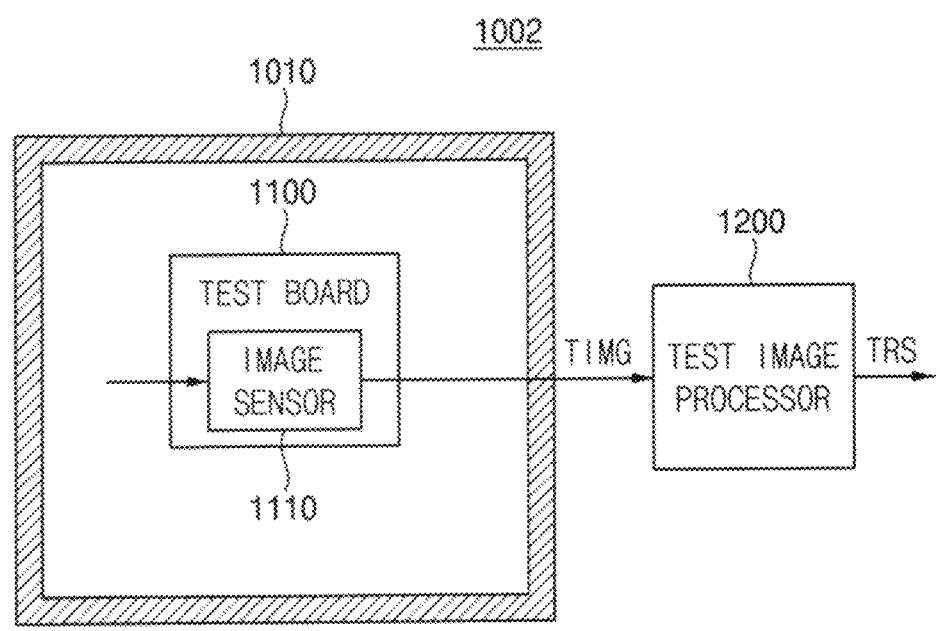

FIGS. 24 and 25 are block diagrams illustrating a test system according to example embodiments.

Referring to FIG. 24, a test system 1000 includes a test board 1100 and a test image processor 1200. The test system 1000 may further include a light shielding member 1010 and a polarization light source 1020.

The test board 1100 is a board on which an image sensor 1110 that is a device under test (DUT) is mounted, and outputs at least one test image TIMG captured by the image sensor 1110. For example, the test board 1100 and the image sensor 1110 may perform step S100 in FIG. 1. Although FIG. 24 illustrates that one image sensor 1110 is mounted on the test board 1100, a plurality of image sensors may be mounted on the test board 1100.

The light shielding member 1010 may surround the test board 1100 on which the image sensor 1110 is mounted and the polarization light source 1020, and may block light from outside. Since external light is blocked by the light shielding member 1010, the image sensor 1110 may capture only light generated from the polarization light source 1020.

The polarization light source 1020 may generate light having a constant polarization direction. For example, although not illustrated in FIG. 24, the polarization light source 1020 may include a light emitting device and a polarizing film.

The test image processor 1200 receives the at least one test image TIMG, performs operations of synthesizing an image, transforming a frequency domain, analyzing the image and determining whether the image sensor 1110 is defective, and outputs a test result signal TRS representing whether the image sensor 1110 is defective. For example, the test image processor 1200 may perform steps S200, S300 and S400 in FIG. 1. In addition, the test image processor 1200 may generate and store a defect map that indicates the location of each determined defect on the image sensor.

In some example embodiments, the test image processor 1200 may include at least one of various data processing devices such as a central processing unit (CPU), a graphic processing unit (GPU), a digital signal processor (DSP), an image signal processor (ISP), etc.

In some example embodiments, the test image processor 1200 may also be surrounded by the light shielding member 1010.

Referring to FIG. 25, a test system 1002 includes a test board 1100 and a test image processor 1200. The test system 1002 may further include a light shielding member 1010. The descriptions repeated with FIG. 24 will be omitted.

The test system 1002 may be substantially the same as the test system 1000 of FIG. 24, except that the polarization light source 1020 is omitted. Since external light is blocked by the light shielding member 1010, the image sensor 1110 may capture an environment without a light source in the light shielding member 1010.

Figure 26:
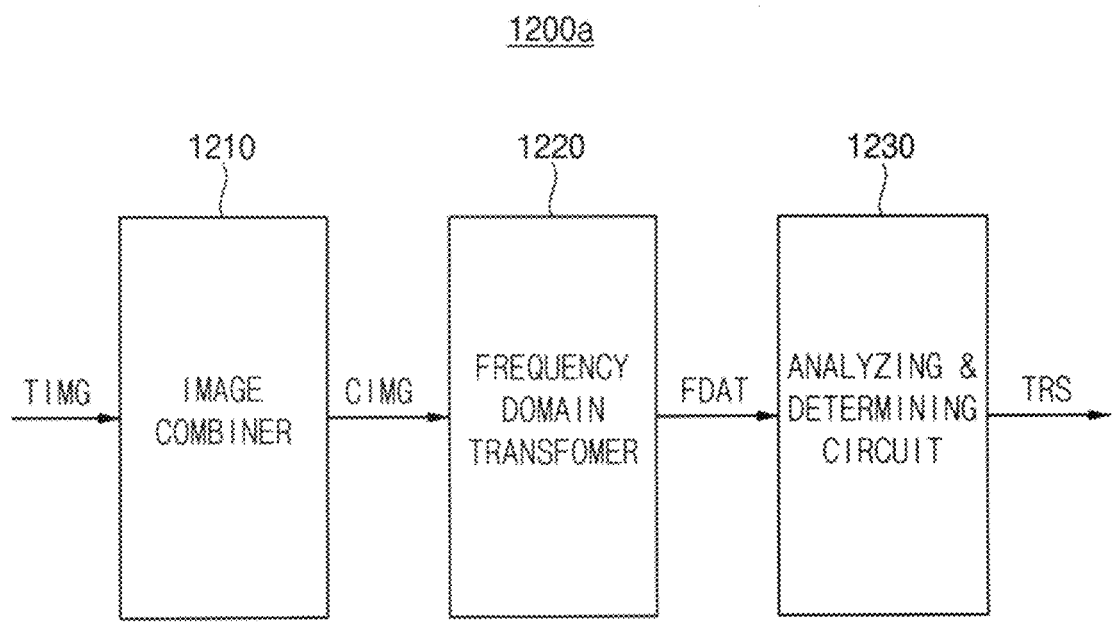
FIG. 26 is a block diagram illustrating an example of a test image processor included in a test system according to example embodiments.

FIG. 26 is a block diagram illustrating an example of a test image processor included in a test system according to example embodiments.

Referring to FIG. 26, a test image processor 1200a may be utilized as the test image processor 1200 in test systems 1000 and 1002 illustrated in FIGS. 24 and 25. Test image processor 1200*a* may include an image combiner 1210, a frequency domain transformer 1220, and an analyzing and determining circuit 1230.

The image combiner 1210 may generate and/or obtain a composite image CIMG by performing an image synthesis operation based on the at least one test image TIMG. For example, the image combiner 1210 may perform step S200 in FIG. 1, and may operate as described with reference to FIGS. 6 through 12. For example, the image combiner 1210 may obtain the composite image CIMG by performing an averaging operation on two or more test images as described with reference to FIGS. 6 and 7 or by performing a subtracting operation on two test images as described with reference to FIGS. 8 and 9. For another example, the image combiner 1210 may obtain one test image TIMG itself as the composite image CIMG as described with reference to FIGS. 10 and 11.

The frequency domain transformer 1220 may generate and/or obtain a plurality of frequency data FDAT by performing a frequency domain transform operation based on the composite image CIMG. For example, the frequency domain transformer 1220 may perform step S300 in FIG. 1, and may operate as described with reference to FIGS. 13 through 16. For example, the frequency domain transformer 1220 may obtain a conversion image by performing the frequency signal processing on a plurality of composite pixel values included in the composite image CIMG, and may obtain the plurality of frequency data FDAT for some or all of a plurality of conversion values included in the conversion image.

The analyzing and determining circuit 1230 may generate and/or obtain the test result signal TRS by performing an analysis and determination operation based on the plurality of frequency data FDAT. For example, the analyzing and determining circuit 1230 may perform step S400 in FIG. 1, and may operate as described with reference to FIGS. 17 through 20. For example, the analyzing and determining circuit 1230 may perform the analysis operation on each of the plurality of frequency data FDAT based on at least one of a threshold value and an adjacent conversion value, and may determine, based on a result of the analysis operation, whether the image sensor 1110 has a defect.

In some example embodiments, at least a part of the image combiner 1210, the frequency domain transformer 1220 and the analyzing and determining circuit 1230 may be implemented as hardware. For example, at least a part of the image combiner 1210, the frequency domain transformer 1220 and the analyzing and determining circuit 1230 may be included in a computer-based electronic system. In other example embodiments, at least a part of the image combiner 1210, the frequency domain transformer 1220 and the analyzing and determining circuit 1230 may be implemented as instruction codes or program routines (e.g., a software program). For example, the instruction codes or the program routines may be executed by a computer-based electronic system, and may be stored in a storage device located inside or outside the computer-based electronic system.

Figure 27:
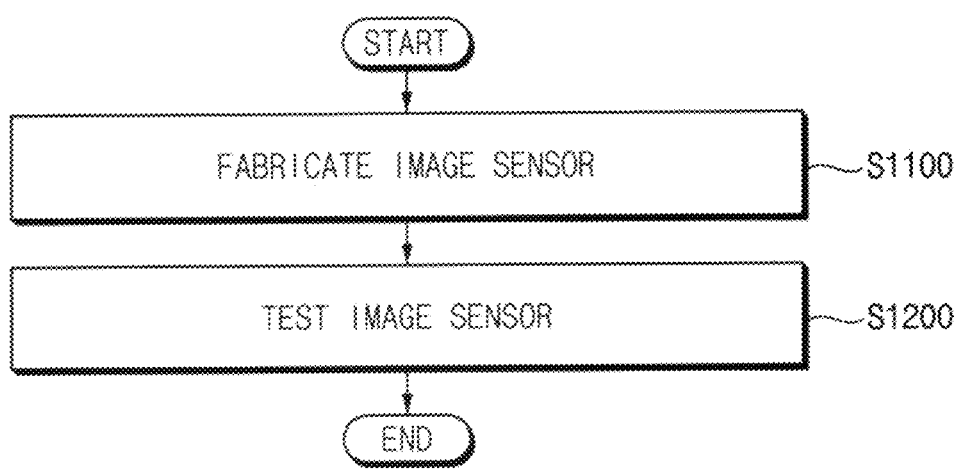
FIG. 27 is a flowchart illustrating a method of manufacturing an image sensor according to example embodiments.

FIG. 27 is a flowchart illustrating a method of manufacturing an image sensor according to example embodiments.

Referring to FIG. 27, in a method of manufacturing an image sensor according to example embodiments, the image sensor is fabricated (step S1100). For example, the image sensor may have the structure described with reference to FIG. 2. For example, the image sensor may be the normal image sensor described with reference to FIGS. 3A, 3B and 3C, or the auto-focus image sensor described with reference to FIGS. 21A and 21B.

The image sensor is tested (step S1200). For example, step S1200 may be performed by the method of testing the image sensor according to example embodiments described with reference to FIG. 1, and may include steps S100, S200, S300 and S400 in FIG. 1. The defects on the image sensor may be accurately and efficiently detected, and thus the manufacturing efficiency may be improved or enhanced.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

FIG. 28 is a block diagram illustrating an electronic system including an image sensor according to example embodiments.

Referring to FIG. 28, an electronic system 1000 may be implemented as a data processing device that uses or supports a mobile industry processor interface (MIPI) interface. The electronic system 1000 may include an application processor 1110, an image sensor 1140 according to example embodiments, and a display device 1150. The electronic system 1000 may further include a radio frequency (RF) chip 1160, a global positioning system (GPS) 1120, a storage 1170, a microphone (MIC) 1180, a dynamic random access memory (DRAM) 1185 and a speaker 1190. In addition, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls operations of the image sensor 1140 and the display device 1150. The application processor 1110 may access the defect map stored on the image processor and utilize the defect map in calibrating the electronic system 1000.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIPI DigRF, and a DigRF MASTER 1114 that controls the data communications of the physical layer 1161. A DigRF SLAVE 1162 of the RF chip 1160 may be controlled through the DigRF MASTER 1114.

In some example embodiments, the DSI host 1111 may include a serializer (SER), and the DSI device 1151 may include a deserializer (DES). In some example embodiments, the CSI host 1112 may include a deserializer (DES), and the CSI device 1141 may include a serializer (SER).

The image sensor 1140 may be the image sensor according to example embodiments, and may be tested based on the method according to example embodiments.

In some example embodiments, the electronic system 1000 may be one of various electronic systems such as a personal computer (PC), a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Although example embodiments are described based on the test method and test system of the image sensor, example embodiments are not limited thereto. For example, example embodiments may be applied or employed to the use of a frequency domain when a test or inspection for detecting defects using an image is performed on a semiconductor integrated circuit such as a display device and a semiconductor device.

The inventive concept may be applied in a manufacturing phase of the image sensors and/or various devices and systems that include the image sensors. For example, the inventive concept may be applied to perform the test or inspection processes in which it is detected whether the defects occur on the image sensors and/or the various devices and systems during the mass production processes.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of testing an image sensor, the method comprising:
    capturing at least one test image using the image sensor that is a device under test (DUT);
    generating a composite image based on the at least one test image;
    generating a plurality of frequency data by performing frequency signal processing on the composite image; and
    determining whether the image sensor is defective by analyzing the plurality of frequency data, wherein when a first conversion value among a plurality of conversion values included in first frequency data is greater than a first threshold value, determining that the image sensor has a defect, the first frequency data being included in the plurality of frequency data.

2. The method of claim 1, wherein generating the composite image includes:
    obtaining the composite image using a first test image through an N-th test image that are different from each other, where N is a natural number greater than or equal to two.

3. The method of claim 2, wherein the composite image is an average image that is obtained by averaging pixel values in the first through N-th test images.

4. The method of claim 1, wherein generating the composite image includes:
    obtaining the composite image using a first test image and a second test image that are different from each other.

5. The method of claim 4, wherein the composite image is a difference image that is obtained by subtracting pixel values in the second test image from pixel values in the first test image.

6. The method of claim 1, wherein generating the composite image includes:
    obtaining the composite image using a first test image, the composite image being the same as the first test image.

7. The method of claim 1, wherein generating the plurality of frequency data includes:
    obtaining a conversion image including a plurality of conversion values by performing the frequency signal processing on pixel values having a same color among a plurality of pixel values included in the composite image, the conversion image corresponding to a frequency domain;
    obtaining first frequency data for first conversion values among the plurality of conversion values; and
    obtaining second frequency data for second conversion values among the plurality of conversion values.

8. The method of claim 7, wherein:
    the first conversion values are arranged on a first line extending along a first direction in the conversion image, and
    the second conversion values are arranged on a second line extending along a second direction crossing the first direction in the conversion image.

9. The method of claim 1, wherein generating the plurality of frequency data includes:
    obtaining a conversion image including a plurality of conversion values by performing the frequency signal processing on pixel values having a same color among a plurality of pixel values included in the composite image, the conversion image corresponding to a frequency domain;
    obtaining first frequency data for first conversion value groups, each of the first conversion value groups includes the same quantity of first conversion values; and
    obtaining second frequency data for second conversion value groups, each of the second conversion value groups includes the same quantity of second conversion values.

10. The method of claim 1, wherein determining whether the image sensor is defective includes:
    when a first conversion value among a plurality of conversion values included in first frequency data is greater than a second conversion value among the plurality of conversion values, and when a difference between the first conversion value and the second conversion value is greater than or equal to a reference range, determining that the image sensor has a defect, the first frequency data being included in the plurality of frequency data, the first conversion value and the second conversion value being adjacent to each other.

11. The method of claim 1, wherein capturing the at least one test image includes:
    obtaining the at least one test image using a polarization light source.

12. The method of claim 1, wherein capturing the at least one test image includes:
    obtaining the at least one test image in an environment without a light source.

13. The method of claim 1, wherein the image sensor includes a plurality of pixels configured to detect an image.

14. The method of claim 1, wherein the image sensor includes first pixels configured to detect an image and second pixels configured to detect a phase difference.

15. A test system comprising:
- a test board on which an image sensor that is a device under test (DUT) is mounted; and
- a test image processor configured to receive at least one test image that is captured by the image sensor, to generate a composite image based on the at least one test image, to generate a plurality of frequency data by performing frequency signal processing on the composite image, and to determine whether the image sensor is defective by analyzing the plurality of frequency data,
- wherein the test image processor includes:
  - an image combiner configured to obtain the composite image by performing an averaging operation on two or more test images or by performing a subtracting operation on two test images;
  - a frequency domain transformer configured to perform the frequency signal processing on pixel values having a same color among a plurality of pixel values included in the composite image, and to obtain the plurality of frequency data for some or all of a plurality of conversion values in which the pixel values having the same color are transformed; and
  - an analyzing and determining circuit configured to perform an analysis operation on each of the plurality of frequency data based on at least one of a threshold value and an adjacent conversion value, and to determine, based on a result of the analysis operation, whether the image sensor has a defect.

16. The test system of claim 15, further comprising:
- a polarization light source configured to generate light having a constant polarization direction,
- wherein the at least one test image is obtained using the polarization light source.

17. The test system of claim 15, further comprising:
- a light shielding member configured to block light,
- wherein the test board and the image sensor are surrounded by the light shielding member, and
- wherein the at least one test image is obtained in an environment without a light source in the light shielding member.

18. A method of testing an image sensor, the method comprising:
- generating, by the image sensor that is a device under test (DUT), a plurality of test images by capturing light generated from a polarization light source or by capturing an environment without a light source;
- generating a composite image by averaging pixel values in the plurality of test images, or by subtracting pixel values in one test image from pixel values in another test image;
- generating a conversion image corresponding to a frequency domain by performing a frequency signal processing on pixel values having a same color among a plurality of pixel values included in the composite image;
- obtaining first frequency data for first conversion values among a plurality of conversion values included in the conversion image, the first conversion values being arranged on a first line extending along a first direction in the conversion image;
- obtaining second frequency data for second conversion values among the plurality of conversion values, the second conversion values being arranged on a second line extending along a second direction crossing the first direction in the conversion image;
- determining, by analyzing each of the first and second frequency data, whether at least one of the first and second frequency data includes a first conversion value greater than a first threshold value;
- determining, by analyzing each of the first and second frequency data, whether at least one of the first and second frequency data includes a second conversion value greater than an adjacent conversion value, a difference between the second conversion value and the adjacent conversion value being greater than or equal to a reference range; and
- determining that the image sensor has a defect when at least one of the first conversion value is greater than the first threshold value and the second conversion value is greater than the adjacent conversion value with the difference between the second conversion value and the adjacent conversion value being greater than or equal to the reference range.

* * * * *